(12) United States Patent
Line et al.

(10) Patent No.: US 11,332,043 B2
(45) Date of Patent: May 17, 2022

(54) CONNECTOR ASSEMBLY FOR A VEHICLE SEAT

(71) Applicant: Ford Global Technologies, LLC, Dearborn, MI (US)

(72) Inventors: Johnathan Andrew Line, Northville, MI (US); Joseph Michael Kish, Canton, MI (US); David James Tippy, Ann Arbor, MI (US); Alan George Dry, Grosse Pointe Woods, MI (US); Jimmy Moua, Canton, MI (US); Adam Ewel, Troy, MI (US); Joshua Gauthier, South Lyon, MI (US); Macit Aktas, Windsor (CA); Michael P. Bell, Oklahoma City, OK (US)

(73) Assignee: Ford Global Technologies, LLC, Dearborn, MI (US)

( * ) Notice: Subject to any disclaimer, the term of this patent is extended or adjusted under 35 U.S.C. 154(b) by 339 days.

(21) Appl. No.: 16/800,618

(22) Filed: Feb. 25, 2020

(65) Prior Publication Data
US 2021/0261020 A1    Aug. 26, 2021

(51) Int. Cl.
*B60N 2/02* (2006.01)
*B60N 2/015* (2006.01)
(Continued)

(52) U.S. Cl.
CPC ............ *B60N 2/0224* (2013.01); *B60N 2/015* (2013.01); *B60N 2/072* (2013.01); *B60N 2002/0264* (2013.01); *B60R 16/023* (2013.01)

(58) Field of Classification Search
CPC .... B60N 2/0224; B60N 2/072; B60N 2/0715; B60N 2002/0236; B60N 2002/0264; B60R 16/0215; B60R 16/023
(Continued)

(56) References Cited

U.S. PATENT DOCUMENTS 4,763,360 A * 8/1988 Daniels ................. H04R 27/00
455/526
6,161,892 A * 12/2000 Chabanne .......... B60N 2/01508
296/65.01
(Continued)

FOREIGN PATENT DOCUMENTS

CN        102057542         5/2011
DE      102009030335 A1    3/2011
(Continued)

*Primary Examiner* — D Glenn Dayoan
*Assistant Examiner* — Wenwei Zhuo
(74) *Attorney, Agent, or Firm* — Vichit Chea; Price Heneveld LLP

(57) ABSTRACT

A track assembly for a vehicle seating assembly includes a track that defines a lateral channel and a central channel. The lateral channel is in communication with the central channel. A plurality of contact strips are coupled with the track and are positioned within the lateral channel. A rail cartridge is positioned within the central channel and is slidable along the track. The lateral channel is at least partially enclosed by the track and the rail cartridge. A support is operably coupled with the rail cartridge and extends from the central channel into the lateral channel. A plurality of contacts are operably coupled with the support and are configured to engage the plurality of contact strips.

20 Claims, 18 Drawing Sheets

(51) Int. Cl.
*B60N 2/07* (2006.01)
*B60R 16/023* (2006.01)

(58) Field of Classification Search
USPC .................................. 296/65.13; 244/118.5
See application file for complete search history.

(56) References Cited

U.S. PATENT DOCUMENTS

| | | | | |
|---|---|---|---|---|
| 7,188,805 | B2* | 3/2007 | Henley | H01R 25/14 |
| | | | | 244/118.5 |
| 7,370,831 | B2* | 5/2008 | Laib | B64C 1/18 |
| | | | | 174/70 B |
| 7,389,960 | B2* | 6/2008 | Mitchell | B64D 11/06 |
| | | | | 244/118.5 |
| 10,960,826 | B2* | 3/2021 | Dry | B60R 11/00 |
| 11,072,260 | B2* | 7/2021 | Aktas | B60N 2/0732 |
| 2019/0061564 | A1* | 2/2019 | Ito | B60N 2/067 |
| 2020/0079243 | A1* | 3/2020 | Bork | B60N 2/0228 |
| 2020/0215936 | A1* | 7/2020 | Teer | B60N 2/0707 |
| 2021/0016681 | A1* | 1/2021 | Tippy | B60N 2/305 |
| 2021/0053467 | A1* | 2/2021 | Aktas | B60N 2/0232 |
| 2021/0078510 | A1* | 3/2021 | Line | H02G 3/283 |
| 2021/0265776 | A1* | 8/2021 | Moulin | B60N 2/072 |

FOREIGN PATENT DOCUMENTS

| | | | | |
|---|---|---|---|---|
| JP | 08332906 | | 12/1996 | |
| JP | H08332906 | A * | 12/1996 | |
| JP | 201520556 | | 11/2015 | |
| JP | 2015205561 | A * | 11/2015 | |
| WO | 2018061843 | A1 | 4/2018 | |
| WO | 2018061844 | A1 | 4/2018 | |
| WO | WO-2018061844 | A1 * | 4/2018 | ............... B60N 2/90 |

* cited by examiner

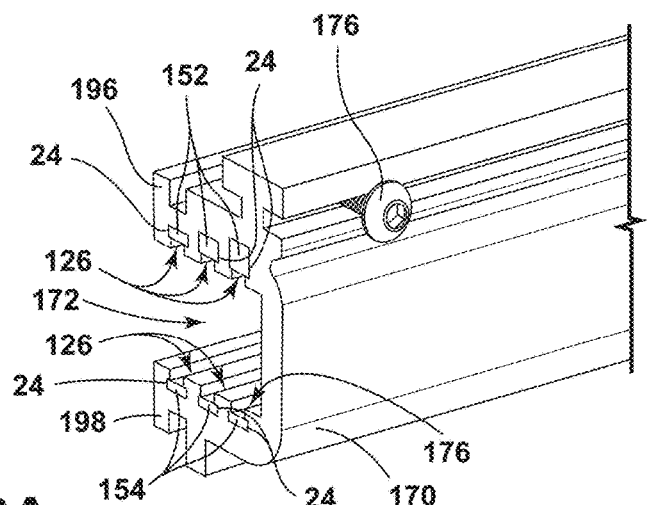
FIG. 6A
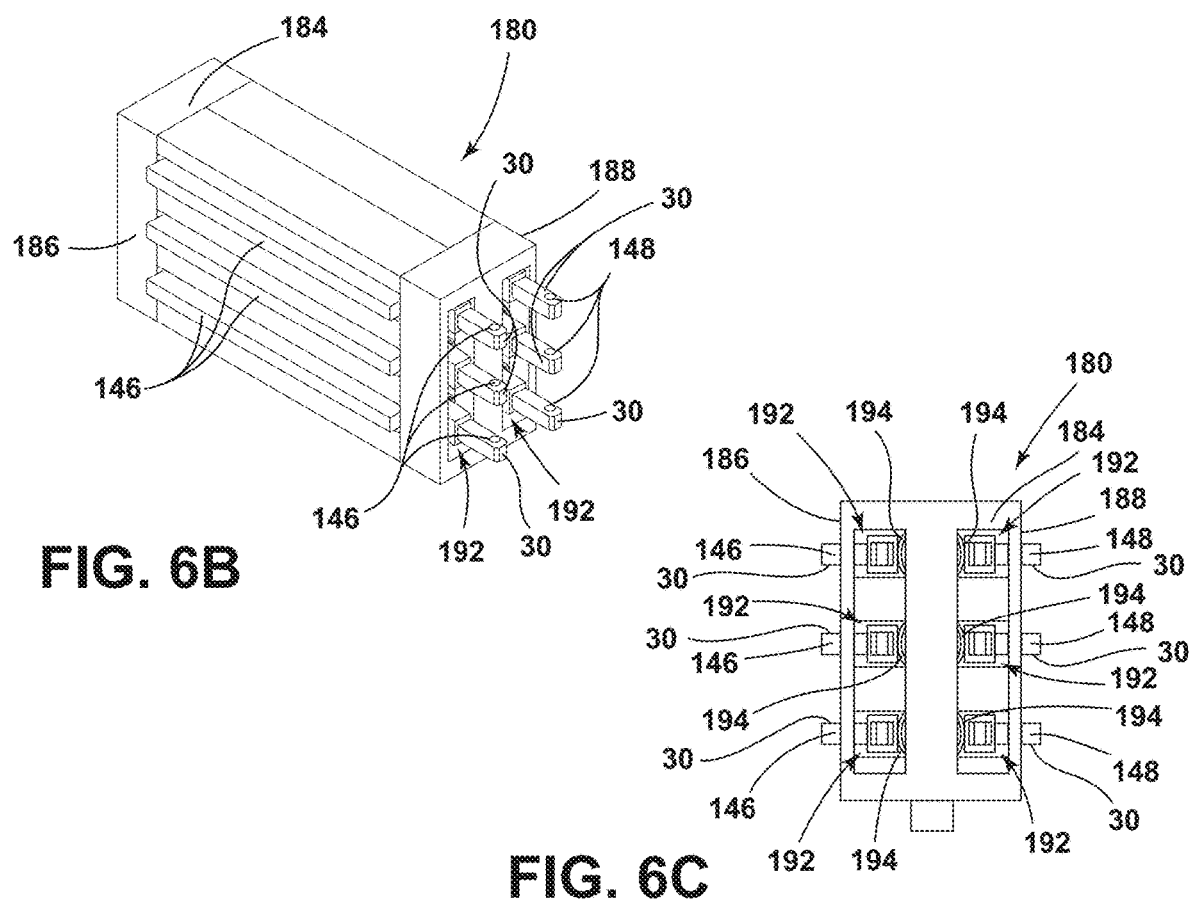
FIG. 6B
FIG. 6C

CONNECTOR ASSEMBLY FOR A VEHICLE SEAT

FIELD OF THE INVENTION

The present invention generally relates to an electrical connector assembly, and more specifically to an electrical connector assembly for a vehicle seat.

BACKGROUND OF THE INVENTION

Vehicle seats often need to be adjusted fore and aft within a vehicle and may need to be removed or inserted within the vehicle. These vehicle seats may also need to be electrically coupled with the vehicle to transfer power and data from the vehicle to the vehicle seats.

SUMMARY OF THE DISCLOSURE

According to one aspect of the present disclosure, a track assembly for a vehicle seating assembly includes a track defining a lateral channel and a central channel. The lateral channel is in communication with the central channel. A conductive rail is coupled with the track and extends along the lateral channel. The conductive rail includes a plurality of contact strips. A rail cartridge is positioned within the central channel and is slidable along the track. The lateral channel is at least partially enclosed by the track and the rail cartridge. A support is operably coupled with the rail cartridge and extends from the central channel into the lateral channel. A plurality of contacts are operably coupled with the support and are configured to engage with the plurality of contact strips.

Embodiments of this aspect of the disclosure can include any one or a combination of the following features:
- a track including first and second lateral walls, the first lateral wall at least partially defining a lateral channel, wherein a conductive rail is positioned to orient a plurality of contact strips parallel to the first lateral wall;
- each of first and second lateral walls integrally formed with one of a first top portion and a second top portion extending perpendicularly from first and second lateral walls, wherein a rail cartridge includes first and second sidewalls positioned substantially flush with the first and second top portions;
- a first sidewall of a rail cartridge defining an opening, wherein a support extends at least partially through the opening;
- a body portion having a surface positioned parallel to and spaced apart from a conductive rail, wherein a plurality of contacts extend from the body portion;
- a first electrical connector positioned within a rail cartridge and configured to engage with a second electrical connector positioned exterior of the rail cartridge;
- an arm extending between a body portion of the support and a first electrical connector;
- a plurality of spring-loaded contacts configured to be biased toward a conductive rail; and/or
- a support configured to house a plurality of electrical components electrically coupled with a plurality of contacts and a first electrical connector.

According to another aspect of the present disclosure, a track assembly for a vehicle seating assembly includes a track defining a lateral channel and a central channel. The lateral channel is in communication with the central channel. A housing is coupled with the track and is positioned within the lateral channel. The housing defines a housing channel. A plurality of contact strips are positioned on an interior surface of the housing. A rail cartridge is positioned within the central channel and is slidable along the track. The lateral channel is at least partially enclosed by the track and the rail cartridge. A support is operably coupled with the rail cartridge and extends from the central channel into the lateral channel. A plurality of contacts are operably coupled with the support and are configured to engage the plurality of contact strips.

Embodiments of this aspect of the disclosure can include any one or a combination of the following features:
- a housing including an outer step, wherein a support includes a plurality of hooks configured to receive the outer step and slidably couple the support with the housing;
- a block extending from an end of the support, wherein the block is configured to be received by the housing channel to clean the conductive strips;
- a brush cartridge slidably positioned within a housing channel and having first and second sides, wherein a plurality of contacts extend from the first and second sides of the brush cartridge;
- a first brush cartridge slidably positioned within a housing channel and coupled with a support, wherein a first portion of a plurality of contacts extends from the first brush cartridge;
- a second brush cartridge slidably positioned within a housing channel and aligned with a first brush cartridge, wherein the second brush cartridge is coupled with a support, and further wherein a second portion of a plurality of contacts extends from the second brush cartridge;
- first and second portions of a plurality of contacts extend in opposing directions; and/or
- a support including a wire tray configured to carry a plurality of electrical wires to electrically couple a plurality of contacts with a vertical electrical connector.

According to another aspect of the present disclosure, a track assembly for a vehicle seating assembly includes a track that defines a lateral channel and a central channel. The lateral channel is in communication with the central channel. A plurality of contact strips are coupled with the track and are positioned within the lateral channel. A rail cartridge is positioned within the central channel and is slidable along the track. The lateral channel is at least partially enclosed by the track and the rail cartridge. A support is operably coupled with the rail cartridge and extends from the central channel into the lateral channel. A plurality of contacts are operably coupled with the support and are configured to engage the plurality of contact strips.

Embodiments of this aspect of the disclosure can include any one or a combination of the following features:
- a plurality of contact strips are coupled with a conductive rail positioned within a lateral channel;
- a plurality of contact strips are coupled with a housing, wherein the housing defines a housing channel and the plurality of contact strips are positioned on an interior surface of the housing;
- a brush cartridge coupled with a support and slidably positioned within the housing channel and configured to carry the plurality of contacts;
- a first brush cartridge coupled with a support and slidably received within a housing channel, wherein a first portion of a plurality of contacts extends from the first brush cartridge in a first direction;

a second brush cartridge coupled with a support and slidably received within a housing channel, wherein the second brush cartridge is aligned with a first brush cartridge, and further wherein a second portion of a plurality of contacts extends from the second brush cartridge in a second direction, the second direction opposite a first direction; and/or a support configured to guide a plurality of wires between a plurality of contacts and an electrical connector, wherein an electrical connector is positioned within a rail cartridge.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings:

FIG. 6A is a side perspective view of the housing of FIG. 5;

FIG. 6B is a side perspective view of the brush cartridge of FIG. 5;

FIG. 6C is a cross-sectional view taken along line C-C of FIG. 6B;

DETAILED DESCRIPTION OF THE PREFERRED EMBODIMENTS

Figure 1:
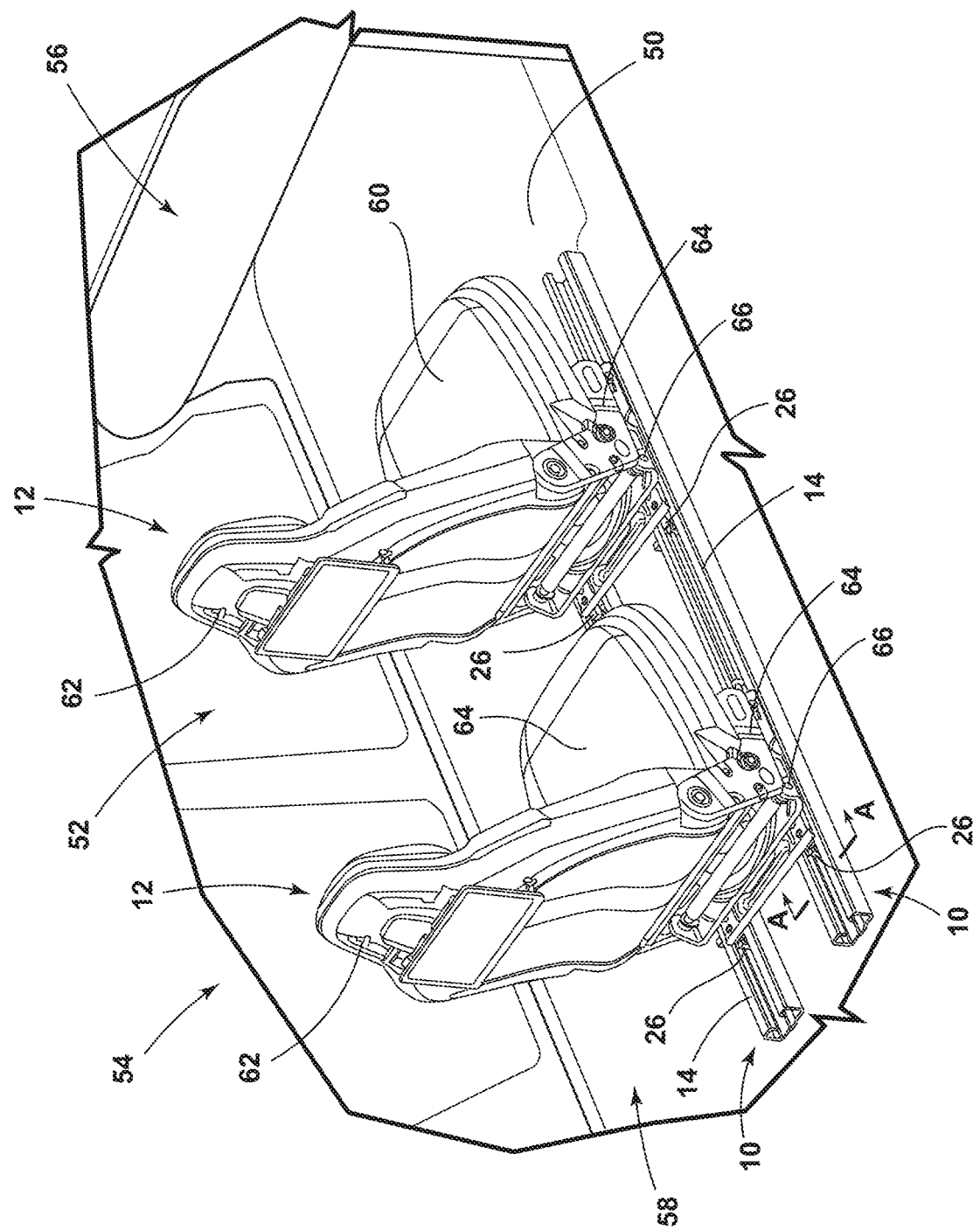
FIG. 1 is a side perspective view of vehicle seating assemblies coupled with a pair of track assemblies, according to various examples.

The present illustrated embodiments reside primarily in combinations of method steps and apparatus components related to a track assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 2:
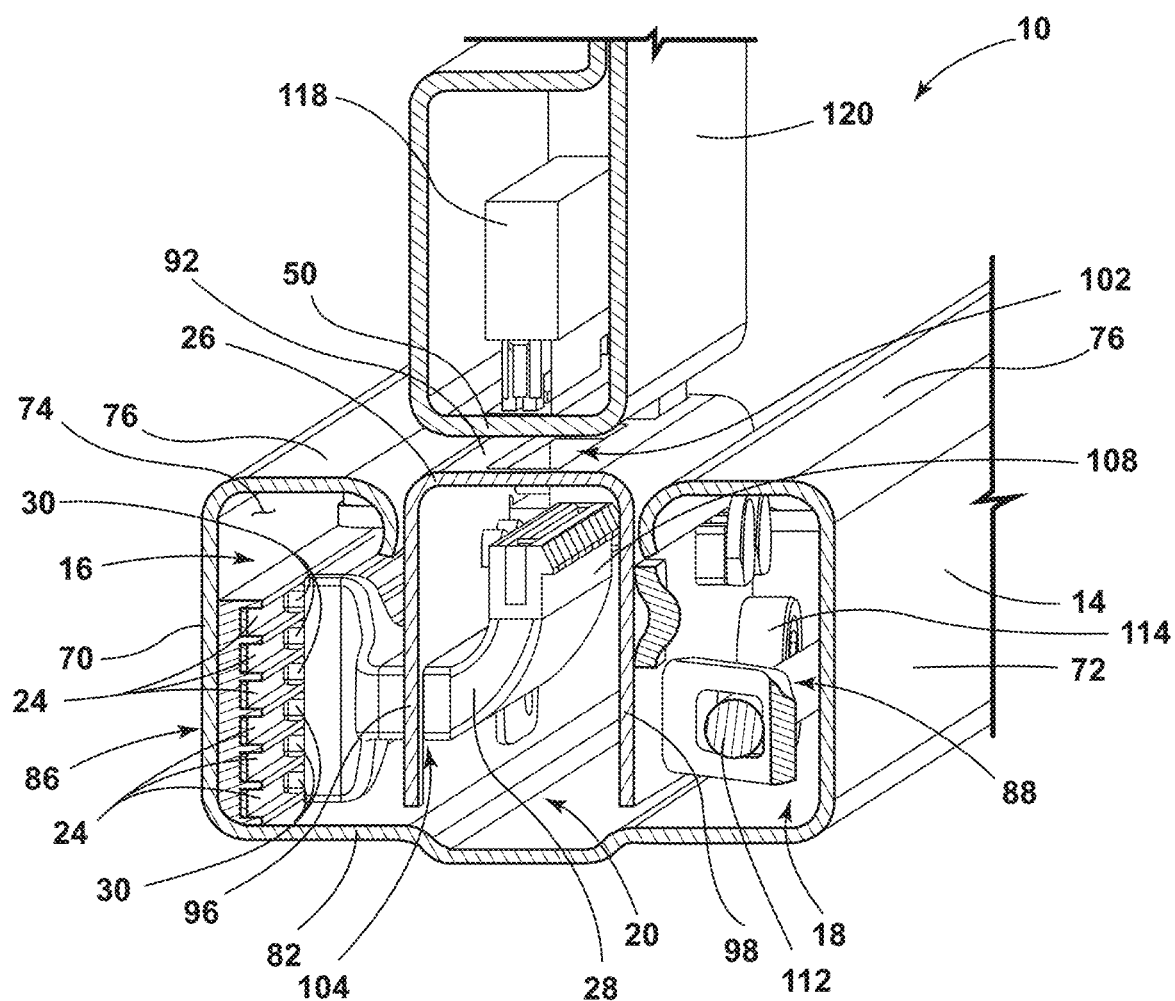
FIG. 2 is a cross-sectional view taken along line A-A of one of the pair of track assemblies of FIG. 1 that illustrates a communication assembly positioned within a track, according to various examples.

For purposes of description herein, the terms "upper," "lower," "right," "left," "rear," "front," "vertical," "horizontal," and derivatives thereof shall relate to the disclosure as oriented in FIG. 2. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-17, reference numeral 10 generally designates a track assembly for a vehicle seating assembly 12. The track assembly 10 includes a track 14 that defines a lateral channel 16 and a central channel 20. The first lateral channel 16 is in communication with the central channel 20. A plurality of contact strips 24 are operably coupled with the track 14 and are positioned within the first lateral channel 16. A rail cartridge 26 is positioned within the central channel 20 and is slidable along the track 14. The first lateral channel 16 is at least partially enclosed by the track 14 and the rail cartridge 26. A support 28, 200, 246, 280 is operably coupled with the rail cartridge 26 and extends from the central channel 20 into the first lateral channel 16. A plurality of contacts 30 are operably coupled with the support 28, 200, 246, 280 and are configured to engage the plurality of contact strips 24.

Referring now to FIGS. 1 and 2, a plurality of vehicle seating assemblies 12 are slidably coupled with the track assembly 10. Each track assembly 10 may include a track 14 and a rail cartridge 26. The track assemblies 10 may be positioned in pairs (e.g., track planks 312) and may be spaced apart. The track assemblies 10 may be coupled with a vehicle 54 in various examples. For example, the track assemblies 10 may be mounted to a floor 50 of a cabin 52 of the vehicle 54. The track 14 of each track assembly 10 may be integrally formed with or operably coupled with the floor 50 of the vehicle 54. The tracks 14 may be positioned over or under a floor cover of the vehicle 54 such that the tracks 14 of the track assemblies 10 may be visible or hidden, depending on the configuration of the vehicle 54. It will be understood that the track assemblies 10 and tracks 14 may be used in any vehicle 54 including, for example, coupes, sedans, SUVs, trucks, etc. It will further be understood that the positioning of the tracks 14 of the track assemblies 10 may be adjusted to accommodate the vehicle type.

In various examples, vehicle seating assemblies 12 may be removably coupled with one or more of the track assemblies 10. While the track assemblies 10 are exemplary illustrated in FIG. 1 coupled with vehicle seating assemblies 12, it will be understood that the track assemblies 10 may be configured to support any rail-mounted component, for example but not limited to, floor consoles, center consoles, storage units that include one or multiple storage compartments, or other vehicle seating assemblies (e.g., bench seats). Each seating assembly 12 includes a seat base 60 operably coupled with a seatback 62. The seat base 60 and the seatback 62 may be pivotably coupled to one another by way of a carrier 64. In various examples, the carrier 64 may be directly coupled to tracks 14 of the track assembly 10 (e.g., by anchors). Alternatively, in various examples, the carrier 64 may be coupled to the tracks 14 indirectly (e.g., by a carriage 66). The seating assemblies 12 may be positioned at various locations along the tracks 14 and may be translatable along the tracks 14 within the vehicle 54.

Referring now to FIGS. 1 and 2, one or more rail cartridges 26 may be slidably coupled with the tracks 14 of the track assemblies 10. According to various examples, the rail cartridges 26 may be positioned in pairs and spaced apart to complement the spacing of the respective tracks 14. Each of the rail cartridges 26 may be movable along the respective track 14 in a forward direction or a rearward direction through the cabin 52 of the vehicle 54. It will be understood that each of the tracks 14 is uniform in size, shape, and engagement to be interchangeable with any of the other tracks 14. It will be further understood that each of the rail cartridges 26 is uniform in size, shape, and engagement to be interchangeable with any of the other rail cartridges 26.

As best illustrated in FIG. 2, each track 14 includes first and second lateral walls 70, 72 each including a top portion 76 and joined a bottom wall 82. The first lateral wall 70 defines a first lateral channel 16 configured to receive a communication assembly 86 configured to provide power or data to the seating assembly 12. The communication assembly 86 is at least partially coupled with an inner surface 74 of the first lateral wall 70 and is configured to operably couple the plurality of contact strips 24 with the plurality of contacts 30, as discussed in more detail below. The second lateral wall 72 of each track 14 defines a second lateral channel 18 configured to receive a motor assembly 88. It is contemplated that the motor assembly 88 may be positioned within the first lateral channel 16 and the communication assembly 86 may be positioned within the second lateral channel 18 without departing from the scope of the present disclosure.

The central channel 20 is defined between the first and second lateral channels 16, 18 and is in communication with each of the first and second lateral channels 16, 18. The central channel 20 is configured to receive a respective rail cartridge 26 such that a top wall 92 of the respective rail cartridge 26 is aligned with the top portions 76 of each of the first and second lateral walls 70, 72 of the track 14. When the rail cartridge 26 is received by the track 14, the rail cartridge 26 is fit within the track 14 such that the first and second lateral channels 16, 18 and the central channel 20 are generally inaccessible without removal of the rail cartridge 26.

With continued reference to FIG. 2, each rail cartridge 26 may be an elongated member including first and second sidewalls 96, 98 spanned by the top wall 92. In other words, each rail cartridge 26 may have a U-shaped cross-section. Each rail cartridge 26 may be configured to enclose the central channel 20 of the track 14, as discussed above. Each rail cartridge 26 may be operably coupled with a drive screw 112, or drive rack, of the motor assembly 88. The drive screw 112 is positioned within the second lateral channel 18 of the track 14 to actuate the rail cartridge 26 relative to the track 14 of the track assembly 10. In various examples, rollers 114 may be operably coupled with the rail cartridge 26 and may be slidable along the bottom wall 82 of the track 14 such that a coefficient of friction between the rollers 114 of the rail cartridge 26 and the bottom wall 82 of the track 14 is decreased when the rail cartridge 26 is being actuated relative to the track 14.

As illustrated in FIG. 2, the top wall 92 of each rail cartridge 26 may define a top slot 102 configured to receive a first upper electrical connector 108. The first upper electrical connector 108 may be positioned within the rail cartridge 26 and may be enclosed within the central channel 20. A second upper electrical connector 118 may be positioned exterior of the rail cartridge 26 and may be configured to selectively couple with the first upper electrical connector 108. The second upper electrical connector 118 is configured to couple with the first upper electrical connector 108 to establish a connection that is capable of transferring power and/or data signals between components of the vehicle 54, components of the vehicle seating assembly 12, and/or components of the track assembly 10. In various examples, the data signals can include, but are not limited to, a position of a vehicle seating assembly 12 within the vehicle 54, inventory of monitored components (e.g., motors, actuators, restraints, etc.) provided on the vehicle seating assembly 12, and status of the monitored components provided on the vehicle seating assembly 12.

Each of the first and second upper electrical connectors 108, 118 may be a quick-connect connector that enables rapid alignment and coupling of the vehicle seating assembly 12 and the track assembly 10. For example, the first and second upper electrical connectors 108, 118 may be configured as card cartridge connectors configured to be spring-biased into electrical engagement when the first upper electrical connector 108 is physically coupled with the second upper electrical connector 118. However, it will be understood that the first and second upper electrical connectors 108, 118 may be any electrical connector configured to transfer power and/or data to the seating assembly 12.

Referring again to FIGS. 1 and 2, in various examples, the vehicle seating assembly 12 may include a connection cartridge 120 configured to be operably coupled with the rail cartridge 26. The connection cartridge 120 may be configured to house the second upper electrical connector 118. However, it will be understood that the second upper electrical connector 118 may be positioned on, and/or coupled with, the vehicle seating assembly 12 in any position or by any coupling method that aligns the second upper electrical connector 118 with the first upper electrical connector 108 without departing from the scope of the present disclosure.

Figure 3A:
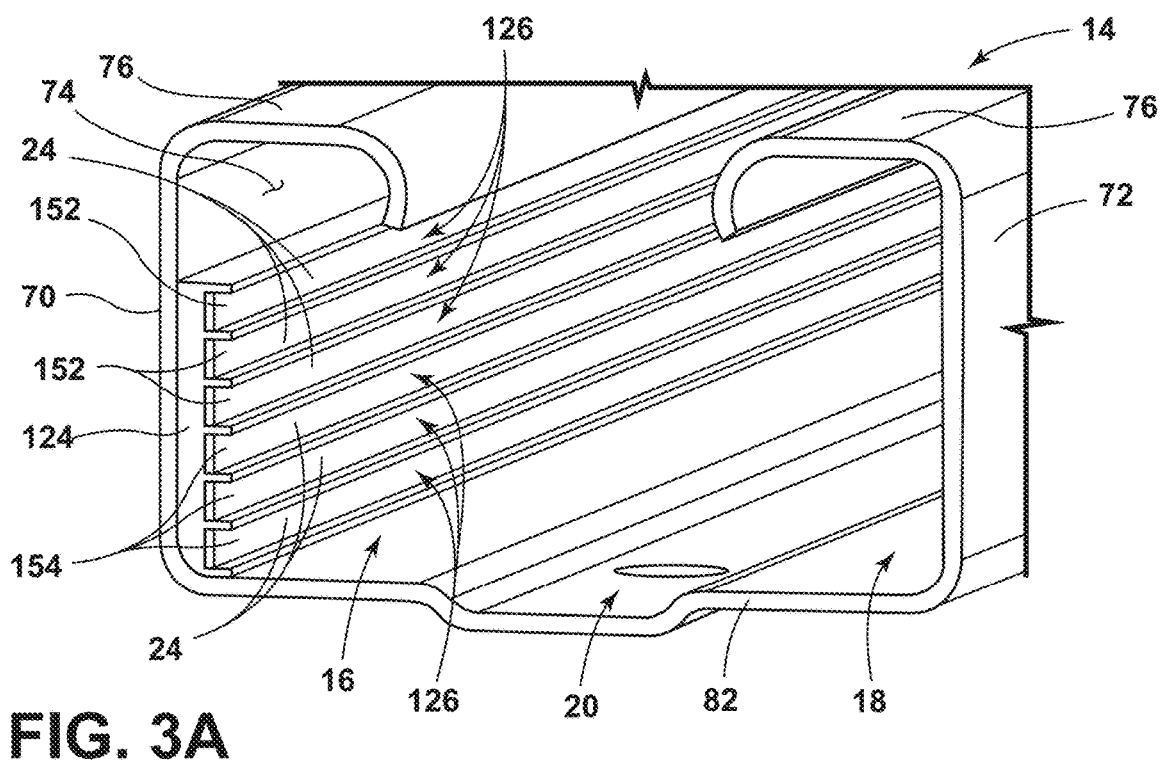
FIG. 3A is a side perspective view of a conductive rail of the communication assembly of FIG. 2.
Figure 3B:
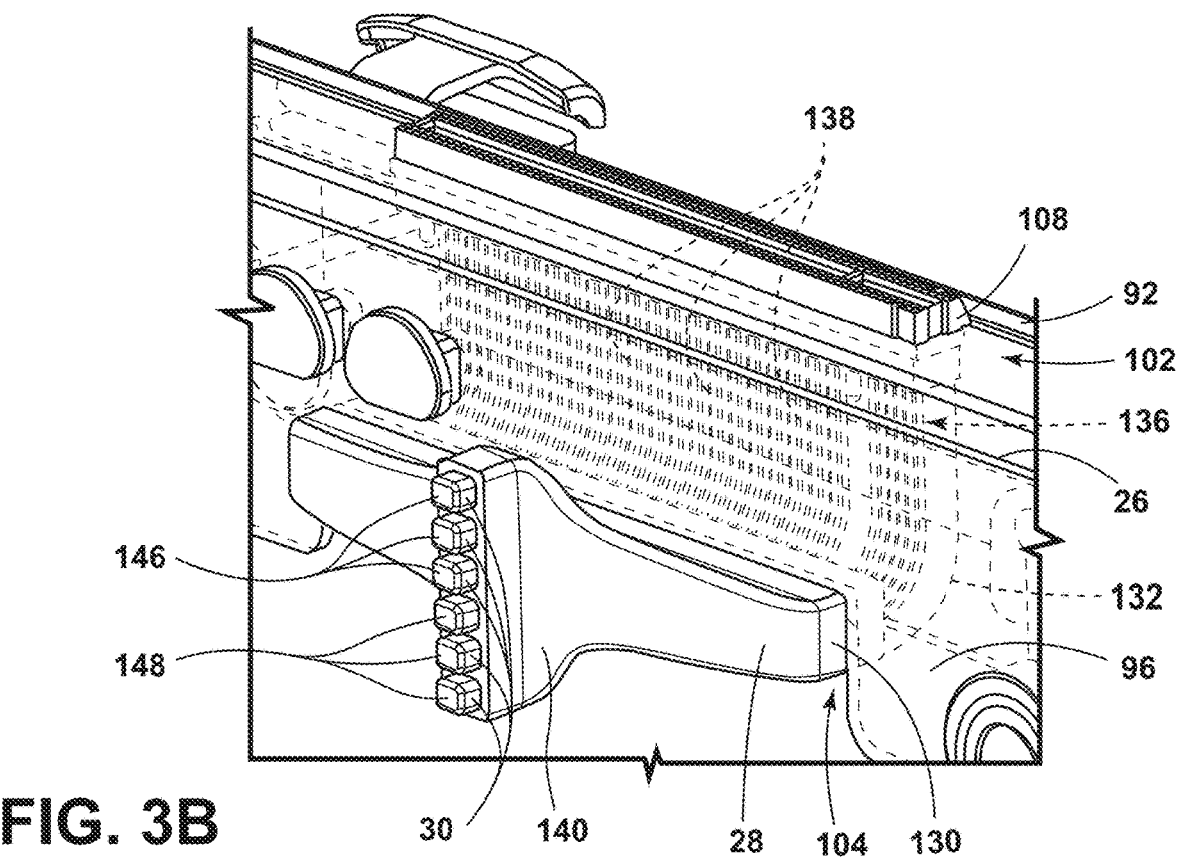
FIG. 3B is a side perspective view of a support of the communication assembly of FIG. 2.

As illustrated in FIGS. 2-3B, the communication assembly 86 is illustrated according to various examples. The communication assembly 86 includes a conductive rail 124 configured to engage with, and guide the movement of, a support 28. As illustrated in FIGS. 2 and 3A, the conductive rail 124 is positioned within the first lateral channel 16 of the track 14 and is operably coupled with the inner surface 74 of the first lateral wall 70 of the track 14. The conductive rail 124 extends at least partially along the track 14 and defines a plurality of channels 126 extending parallel along the conductive rail 124. As illustrated, the conductive rail 124 defines six channels 126. However, it is contemplated that the conductive rail 124 may be configured to define any number of channels 126 without departing from the scope of the present disclosure.

Each of the plurality of channels 126 is sized to receive one of the plurality of contact strips 24. The number of channels 126 is at least equal to the number of contact strips 24, and each channel 126 is configured to house a respective contact strip 24 of the plurality of contact strips 24. The plurality of channels 126 are configured to receive and guide the plurality of contacts 30 such that the plurality of contacts 30 are engaged with the plurality of contact strips 24 when the conductive rail 124 is coupled with the support 28, as discussed in more detail below.

Referring now to FIGS. 2 and 3B, the support 28 is positioned within and coupled to the rail cartridge 26 of the track assembly 10 such that the support 28 is slidable in conjunction with the rail cartridge 26. As illustrated, the support 28 may be generally L-shaped having a first portion 130 and a second portion 132. The first portion 130 of the support 28 may extend through or beneath one of the first and second sidewalls 96, 98 of the rail cartridge 26. For example, the first portion 130 of the support 28 may extend through a side slot 104 of the first sidewall 96. The first sidewall 96 of the rail cartridge 26 may define the side slot 104 as an enclosed slot where the first sidewall 96 wraps around the first portion 130 of the support 28 or, as illustrated, the first sidewall 96 of the rail cartridge 26 may define the side slot 104 as a downwardly opening slot such that the first sidewall 96 is configured to be positioned over the first portion 130 of the support 28.

The second portion 132 of the support 28 may be substantially disposed within the central channel 20 and surrounded by the rail cartridge 26. The first upper electrical connector 108 may be positioned proximate and/or coupled with the second portion 132 of the support 28 such that the first upper electrical connector 108 is aligned with the top slot 102 of the rail cartridge 26. In various examples, the first upper electrical connector 108 may be coupled with the top wall 92 of the rail cartridge 26. The support 28 is configured to electrically couple the first upper electrical connector 108 with the plurality of contacts 30 of the communication assembly 86 positioned within the first lateral channel 16 of the respective track 14, as discussed in more detail below.

Referring still to FIGS. 2 and 3B, the first and second portions 130, 132 of the support 28 may be operably coupled or integrally formed. One or both of the first and second portions 130, 132 of the support 28 may be operably coupled with or supported by the rail cartridge 26 such that the support is slidable along the track 14 in conjunction with the rail cartridge 26, as previously discussed. Together, the first and second portions 130, 132 of the support 28 may define a receiving space 136 configured to house a plurality of conduits 138. The plurality of conduits 138 may be wires configured to transfer data and/or power between the plurality of contacts 30 and the first upper electrical connector 108. The plurality of conduits 138 may be configured as individual wires or may be formed as a wire ribbon. In other words, the support 28 may be configured to act as a wire harness for the plurality of conduits 138.

As best illustrated in FIG. 3B, a vertically extending contact housing 140 extends from the first portion 130 of the support 28 and is configured to at least partially house the plurality of contacts 30. For example, where the plurality of contacts 30 are spring-loaded, the vertically extending contact housing 140 may be configured to house an end of the plurality of contacts 30 and a plurality of springs for biasing the plurality of contacts 30 away from the vertically extending contact housing 140. The vertically extending contact housing 140 may be integrally formed with or operably coupled with the first portion 130 of the support 28 at a first side of the vertically extending contact housing 140. Each of the plurality of contacts 30 extends from a second, opposing side of the vertically extending contact housing 140 and is configured to be selectively engaged with one of the plurality of contact strips 24.

In various examples, the plurality of contacts 30 may be a plurality of brush contacts 30 configured to be received by the plurality of channels 126 defined by the conductive rail 124. In various examples, the plurality of contacts 30 of a track assembly 10 of a track plank 312 are configured to communicate data between the vehicle 54 and the vehicle seating assembly 12 and the plurality of contacts 30 of a track assembly 10 of the track plank 312 are configured to communicate power between the vehicle 54 and the vehicle seating assembly 12. In other examples, the plurality of contacts 30 includes a first portion 146 configured to transmit data and a second portion 148 configured to transmit power. For example, the first portion 146 of the plurality of contacts 30 may include a motor assembly data contact and/or data contacts for other components of the vehicle seating assembly 12 (e.g., a restraint component), and the second portion 148 of the plurality of contacts 30 may include a motor assembly power contact and/or power contacts for other components of the vehicle seating assembly 12. As illustrated in FIGS. 2 and 3B, the first and second portions 146, 148 of the plurality of contacts 30 extend from the support 28 in a first direction as a single brush cartridge or brush assembly. However, it is contemplated that the first portion 146 of the plurality of contacts 30 and the second portion 148 of the plurality of contacts 30 may be formed separately as separate brush assemblies.

Referring again to FIGS. 2-3B, when the plurality of contacts 30 are received by the plurality of channels 126, the plurality of contacts 30 are electrically coupled with the plurality of contact strips 24. Where the plurality of contacts 30 includes first and second portions 146, 148, the plurality of contact strips 24 may include a first portion 152 and a second portion 154 configured to be operably coupled with the first and second portions 146, 148 of the plurality of contacts 30, respectively. For example, the first portion 152 of the plurality of contact strips 24 may include a motor assembly data strip and/or data strips for other components of the vehicle seating assembly 12 configured to engage with the corresponding contacts of the plurality of contacts 30, and the second portion 154 of the plurality of contact strips 24 may include a motor assembly power strip and/or power strips for other components of the vehicle seating assembly 12 configured to engage with the corresponding contacts of the plurality of contacts 30. As previously discussed, the plurality of contacts 30 may be spring-loaded to maintain engagement of the plurality of contacts 30 with the plurality of contact strips 24. However, it is contemplated that any method of maintaining engagement of the plurality of contacts 30 with the plurality of contact strips 24 may be used without departing from the scope of the present disclosure.

Figure 7:
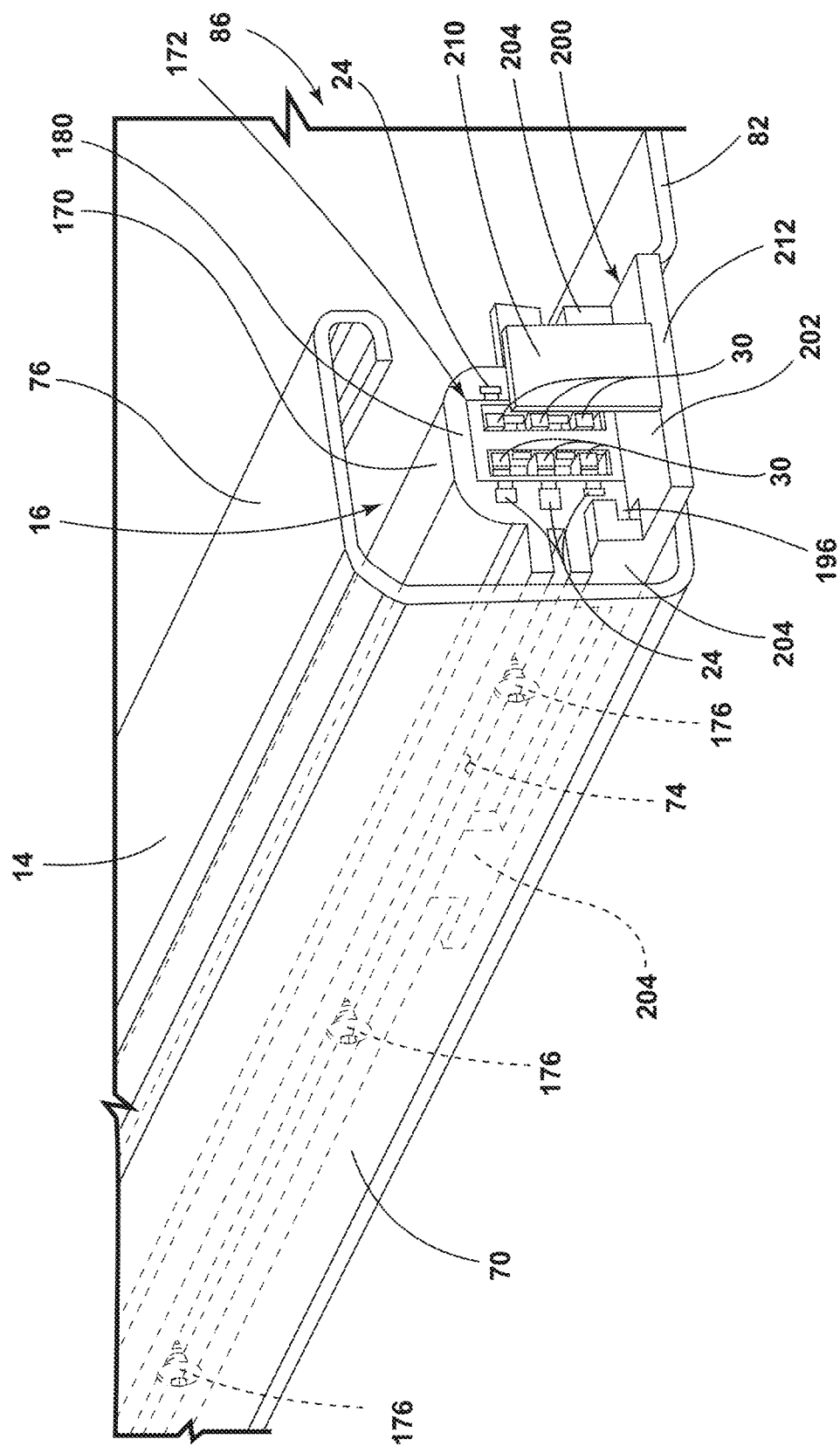
FIG. 7 is a side perspective view of an end of a track assembly including a communication assembly, according to various examples.
Figure 8:
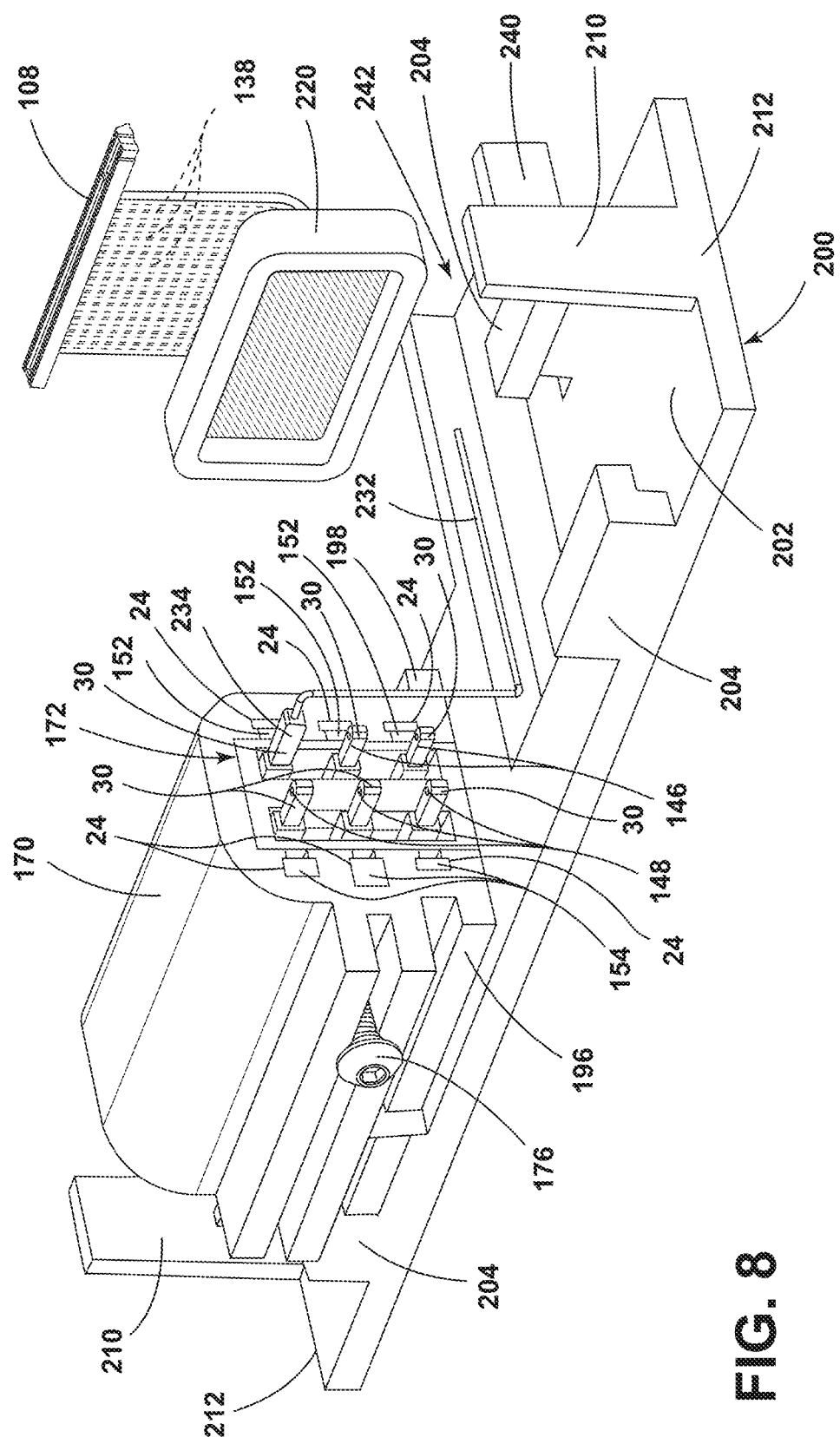
FIG. 8 is a side perspective view of the communication assembly of FIG. 7 with a portion of a housing illustrated for clarity and a brush cartridge exemplary positioned within the portion of the housing.
Figure 9:
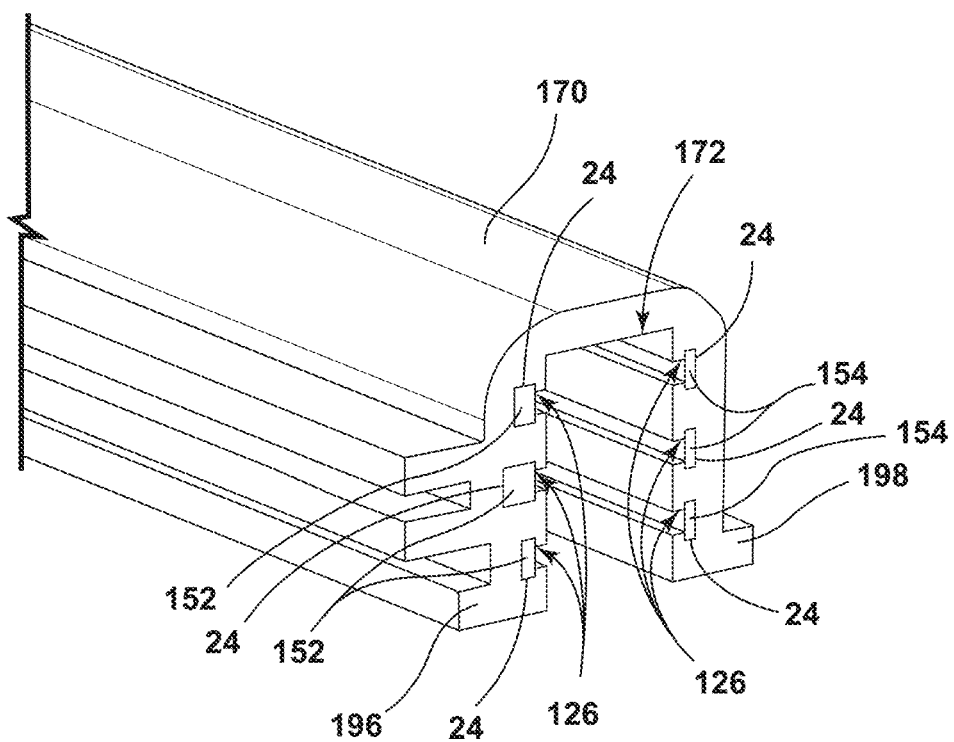
FIG. 9 is a side perspective view of the housing of FIG. 8.

Referring now to FIGS. 4-14, the communication assembly 86 is illustrated having a protective housing 170, according to various examples. The housing 170 defines a housing channel 172 configured to receive a single brush cartridge 180 (FIGS. 4-9) or multiple brush cartridges 180A, 180B (FIGS. 10-14). As illustrated in FIGS. 4-6C, in various examples, the housing channel 172 may be defined to open toward the inner surface 74 of the first lateral wall 70 and receive a single brush cartridge 180. In other examples, as illustrated in FIGS. 7-9, the housing channel 172 may be defined to open toward the bottom wall 82 of the track 14 and receive a single brush cartridge 180. In still other examples, the housing channel 172 may be defined to open toward the bottom wall 82 of the track 14 and receive first and second brush cartridges 180A, 180B, as illustrated in FIGS. 10-14.

Figure 4:
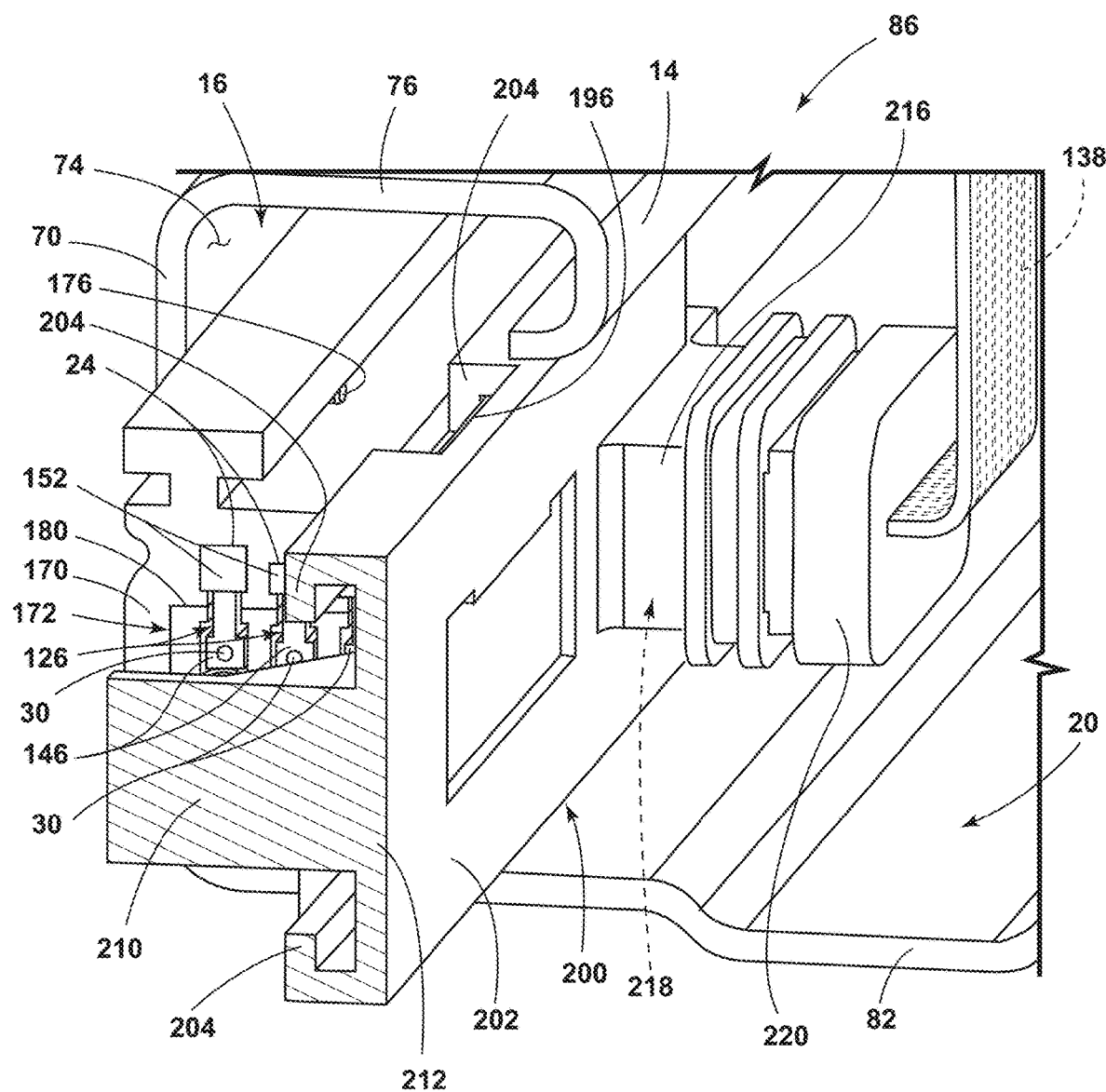
FIG. 4 is a first side perspective view of an end of a track assembly including a communication assembly, according to various examples.
Figure 5:
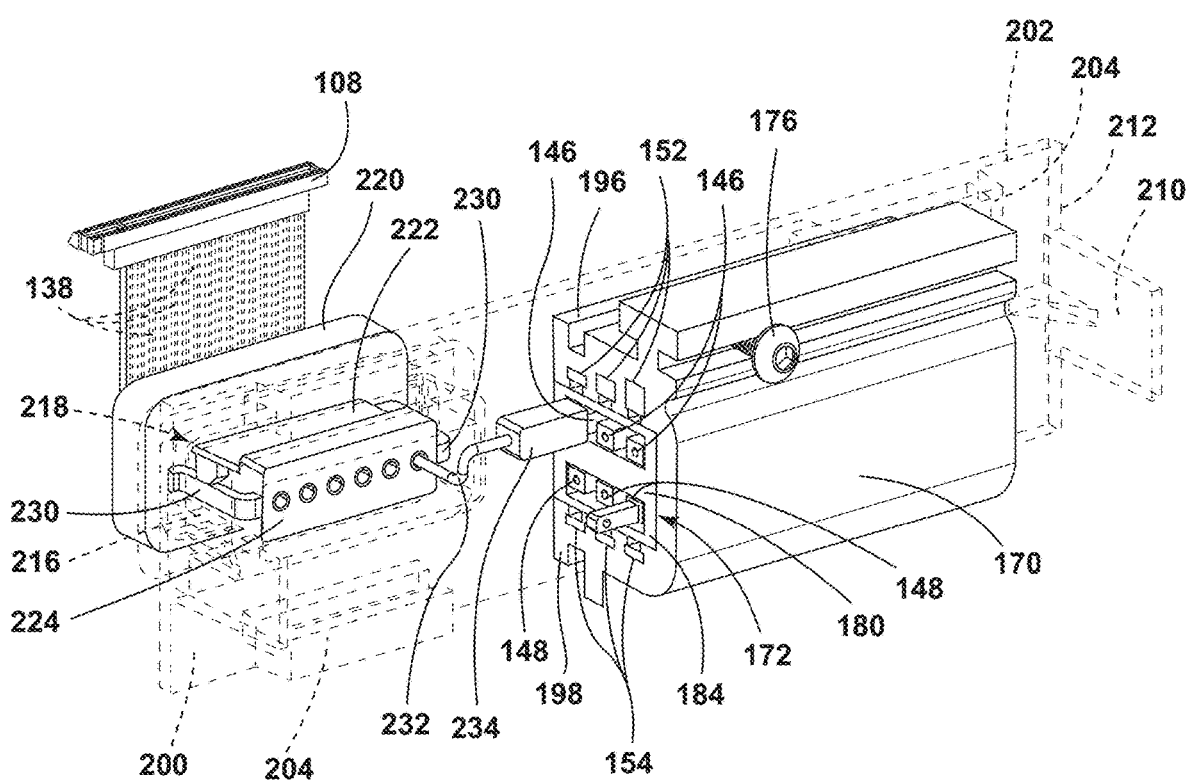
FIG. 5 is a second side perspective view of the communication assembly of FIG. 4 with a portion of a housing illustrated for clarity and a brush cartridge exemplary positioned within the portion of the housing.

As illustrated in FIGS. 4 and 5, the communication assembly 86 is positioned within the first lateral channel 16 of the track 14 such that the housing 170 is coupled with the inner surface 74 of the first lateral wall 70. For example, the housing 170 may be fixedly coupled with the track 14 by a plurality of fasteners 176. The housing 170 extends at least partially along the length of the track 14 and is configured to protect the plurality of contact strips 24. For example, the housing 170 may be formed as an extruded conductor carrier.

As best shown in FIGS. 5 and 6A, the housing 170 defines the housing channel 172 and further defines the plurality of channels 126 in communication with the housing channel 172. The housing channel 172 may have a square cross-section, as illustrated, and the plurality of channels 126 may be defined on one or more inner sides of the housing 170 along the periphery of the channel 172. As previously discussed, the plurality of channels 126 are configured to house the plurality of contact strips 24 such that the plurality of contact strips 24 are accessible through the housing channel 172. In various examples, the first portion 152 of the plurality of contact strips 24 may be positioned on a first side of the housing channel 172 and the second portion 154 of the plurality of contact strips 24 may be positioned on a second side of the housing channel 172. It is contemplated that the housing channel 172 may have any other cross-section configured to be in communication with the plurality of channels 126 and/or house the plurality of contact strips 24 without departing from the scope of the present disclosure.

The housing 170 includes first and second outer steps 196, 198 positioned on opposing sides of the housing 170. Each of the first and second outer steps 196, 198 extends outward from the housing 170 away from the housing channel 172. The first and second outer steps 196, 198 are configured to act as a guide to be by a support 200, as discussed below.

Referring now to FIGS. 4 and 5, the brush cartridge 180 is positioned within, and movable along, the housing channel 172 by the support 200. As best illustrated in FIGS. 6B and 6C, the brush cartridge 180 includes a body 184 defining a plurality of receiving spaces 192. Each of the plurality of contacts 30 is positioned within one of the plurality of receiving spaces 192 and is operably coupled with the body 184 of the brush cartridge 180. The plurality of contacts 30 are positioned within the plurality of receiving spaces 192 such that the plurality of contacts 30 extend outward from the body 184 of the brush cartridge 180. For example, as illustrated, a plurality of springs 194 may be positioned within the plurality of receiving spaces 192 between the body 184 and the plurality of contacts 30 such that each spring 194 is positioned to bias one of the plurality of contacts 30 outward and away from the body 184.

When the brush cartridge 180 is positioned within the housing channel 172, each of the plurality of contacts 30 is positioned to engage with one of the plurality of contact strips 24. Where the plurality of contacts 30 include a first portion 146 and a second portion 148, the first portion 146 of the plurality of contacts 30 may be positioned to extend from a first side 186 of the brush cartridge 180 and the second portion 148 of the plurality of contacts 30 may be positioned to extend from a second, opposing side 188 of the brush cartridge 180. The first portion 146 of the plurality of contacts 30 is positioned to engage with the first portion 152 of the plurality of contact strips 24 and the second portion 148 of the plurality of contacts 30 is positioned to engage with the second portion 154 of the plurality of contact strips 24. The plurality of contacts 30 and the plurality of contact strips 24 are configured to be electrically engaged to transfer data and power through the communication assembly 86, as discussed in more detail elsewhere herein.

Referring again to FIGS. 4 and 5, the brush cartridge 180 is a single brush cartridge supported by the support 200. The brush cartridge 180 is operably coupled with the support 200 such that the movement of the support 200 along the housing 170 moves the brush cartridge 180 within the housing channel 172. For example, the brush cartridge 180 may be coupled with the support 200 by heat staking, fasteners, welding, adhesive, or any other form of coupling configured to fixedly couple the brush cartridge 180 with the support 200.

The support 200 includes a base portion 202 extending parallel to the first and second steps 196, 198 of the housing 170. The base portion 202 is positioned within the first lateral channel 16 and is configured to slide along the housing 170. For example, the base portion 202 defines a plurality of hooks 204 extending from the base portion 202 towards the housing 170. The first and second steps 196, 198 are substantially flush with the base portion 202 of the support 200 such that each of the plurality of hooks 204 are configured to be slidably engaged with one of the first and second outer steps 196, 198 of the housing 170. The first and second outer steps 196, 198 of the housing 170 act as a guide for the plurality of hooks 204, which are configured to slidably couple the support 200 with the housing 170.

The support 200 further includes a block member 210 extending from an end 212 of the base portion 202 in the same direction as the plurality of hooks 204. The block member 210 may be integrally formed with the base portion 202 or may be coupled with the base portion 202 (e.g., via spot welding). The block member 210 is aligned with and spaced apart from the brush cartridge 180. The block member 210 is sized and shaped to be received by the housing channel 172 and is configured to clean the plurality of contact strips 24 as the brush cartridge 180 is moved along the channel 172. For example, the block member 210 may include scrapers or wipers to contact and clean the contact strips 24 as the support 200 moves along the housing 170.

With continued reference to FIGS. 4 and 5, the support 200 further includes a sleeve 216 extending from the base portion 202 in a direction opposite the plurality of hooks 204. The sleeve 216 defines a receiving space 218 configured to be engaged with a connector housing 220. One of the connector housing 220 and the sleeve 216 may be coupled with the rail cartridge 26 or may extend through the side slot 104 of the rail cartridge 26. For example, the sleeve 216 may be configured to be flexible and extend through the side slot 104 of the rail cartridge 26.

The connector housing 220 is configured to house a first lower electrical connector 222. However, it is contemplated that the first lower electrical connector 222 may be positioned exterior of the support 200 and/or configured to be coupled with the sleeve 216 without the housing 220 without departing from the scope of the present disclosure. As illustrated, the first lower electrical connector 222 may be electrically coupled with the first upper electrical connector 108 via a plurality of conduits 138. For example, the first lower electrical connector 222 may be electrically coupled with the first upper electrical connector 108 via a ribbon wire of conduits 138. The conduits 138 may be positioned within a portion of the connector housing 220 or may be exposed within the rail cartridge 26.

The first lower electrical connector 222 is configured to be coupled with and electrically engaged with a second lower electrical connector 224 positioned within the sleeve 216. For example, the second lower electrical connector 224 may include a plurality of arms 230 configured to snap engage with the first lower electrical connector 222. The second lower electrical connector 224 may be operably coupled with an interior of the sleeve 216 such that the coupling of the first lower electrical connector 222 with the second lower electrical connector 224 and the coupling of the connector housing 220 with the sleeve 216 operably couples the support 200 with the rail cartridge 26.

As best illustrated in FIG. 5, a plurality of conduits 232 may be configured to couple the brush cartridge 180 with the second lower electrical connector 224. Each of the plurality of conduits 232 may include conduit connectors 234 configured to engage and/or be operably connected with connecting ends of each of the plurality of contacts 30. The plurality of conduits 232 are configured to communicate data and/or power between the second lower electrical connector 224 and the brush cartridge 180, as discussed in more detail below.

Referring now to FIGS. 7 and 8, the communication assembly 86 is illustrated with the housing 170 operably coupled with the lateral wall 70 of the track 14. The housing 170 is positioned within the first lateral channel 16 such that the housing channel 172 is positioned to open downwards toward the bottom wall 82 of the track 14. The base portion 202 of the support 200 is positioned between the bottom wall 82 of the track 14 and the housing 170. As illustrated in FIGS. 7-9, the housing 170 and the support 200 are similar to those described in detail with respect to FIGS. 4-6C. Where the components are the same or similar, the same numbers have been used.

As previously described, and as illustrated in detail in FIG. 9, the housing 170 defines the housing channel 172 and further defines the plurality of channels 126 in communication with the housing channel 172. In various examples, the first portion 152 of the plurality of contact strips 24 may be positioned on a first side of the housing channel 172 and the second portion 154 of the plurality of contact strips 24 may be positioned on a second side of the housing channel 172. The housing 170 further includes the first and second outer steps 196, 198 positioned on opposing sides of the housing 170. As illustrated in FIG. 7, the first and second outer steps 196, 198 extend outward from the housing 170 and are substantially parallel with, and spaced apart from, the bottom wall 82 of the track 14.

Referring again to FIGS. 7 and 8, the brush cartridge 180, as described in detail above with respect to FIGS. 6B and 6C, is a single brush operably coupled with the support 200 such that the movement of the support 200 along the housing 170 moves the brush cartridge 180 within the housing channel 172. For example, as discussed previously, the brush cartridge 180 may be coupled with the support 200 by heat staking, fasteners, welding, adhesive, or any other form of coupling configured to fixedly couple the brush cartridge 180 with the support 200.

The plurality of contacts 30 are positioned to extend outward from the body 184 of the brush cartridge 180 to engage with one of the plurality of contact strips 24 when the brush cartridge 180 is received by the housing channel 172. Where the plurality of contacts 30 include a first portion 146 and a second portion 148, the first portion 146 of the plurality of contacts 30 may be positioned to extend from a first side 186 of the brush cartridge 180 and the second portion 148 of the plurality of contacts 30 may be positioned to extend from a second, opposing side 188 of the brush cartridge 180. The first portion 146 of the plurality of contacts 30 is positioned to engage with the first portion 152 of the plurality of contact strips 24 and the second portion 148 of the plurality of contacts 30 is positioned to engage with the second portion 154 of the plurality of contact strips 24. The plurality of contacts 30 and the plurality of contact strips 24 are configured to be electrically engaged to transfer data and power through the communication assembly 86, as discussed in more detail elsewhere herein.

With continued reference to FIGS. 7 and 8 and as previously described with respect to FIGS. 4 and 5, the base portion 202 of the support 200 is configured with the plurality of hooks 204 configured to slidably couple with the first and second steps 196, 198 of the housing 170. The base portion 202 includes the block member 210 extending in the same direction as the plurality of hooks 204 and configured to slide along the housing channel 172 to clean the plurality of contact strips 24.

The base portion 202 of the support 200 further includes an extension 240 instead of the sleeve 216 defining a guide space 242. The extension 240 is integrally formed with the base portion 202 of the support 200 or may be operably coupled with the base portion 202 (e.g., using spot welding or other coupling methods). The extension 240 may be configured as a wire tray to house the plurality of conduits 232 extending between the brush cartridge 180 and the housing 220. While not illustrated in FIGS. 7 and 8, it is contemplated that the first and second lower electrical connectors 222, 224, as discussed above with respect to FIGS. 4 and 5, may be coupled with the housing 220 such that the plurality of conduits 232 extend along the guide space 242 to engage with the second lower electrical connector 224. It is also contemplated that the plurality of conduits 138, 232 may be integrally formed or coupled or that the plurality of conduits 138, 232 may be combined as a single conduit extending between the first upper electrical connector 108 and the brush cartridge 180 without departing from the scope of the present disclosure.

Figure 10:
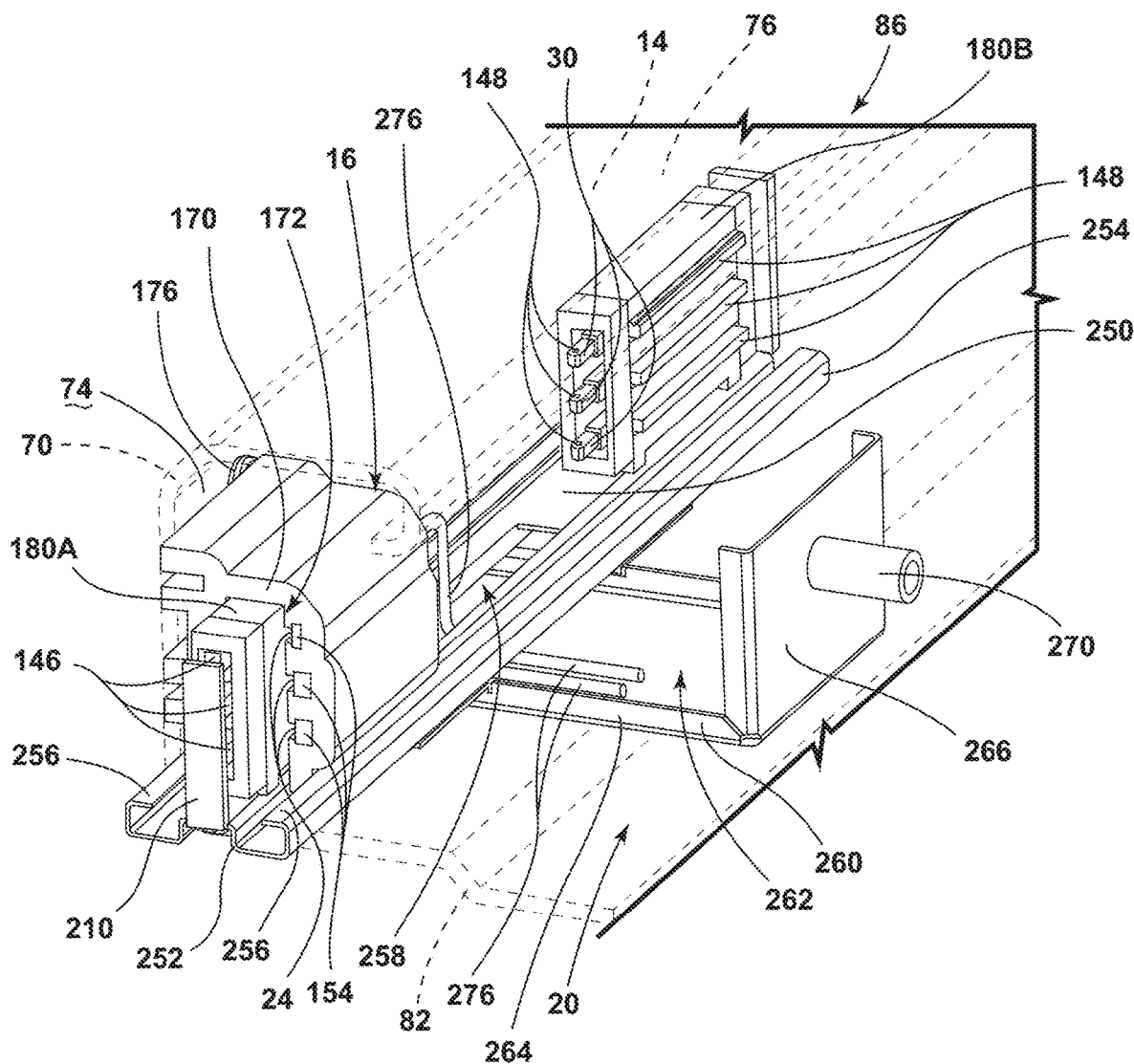
FIG. 10 is a side perspective view of an end of a track assembly including a communication assembly, according to various examples.
Figure 11:
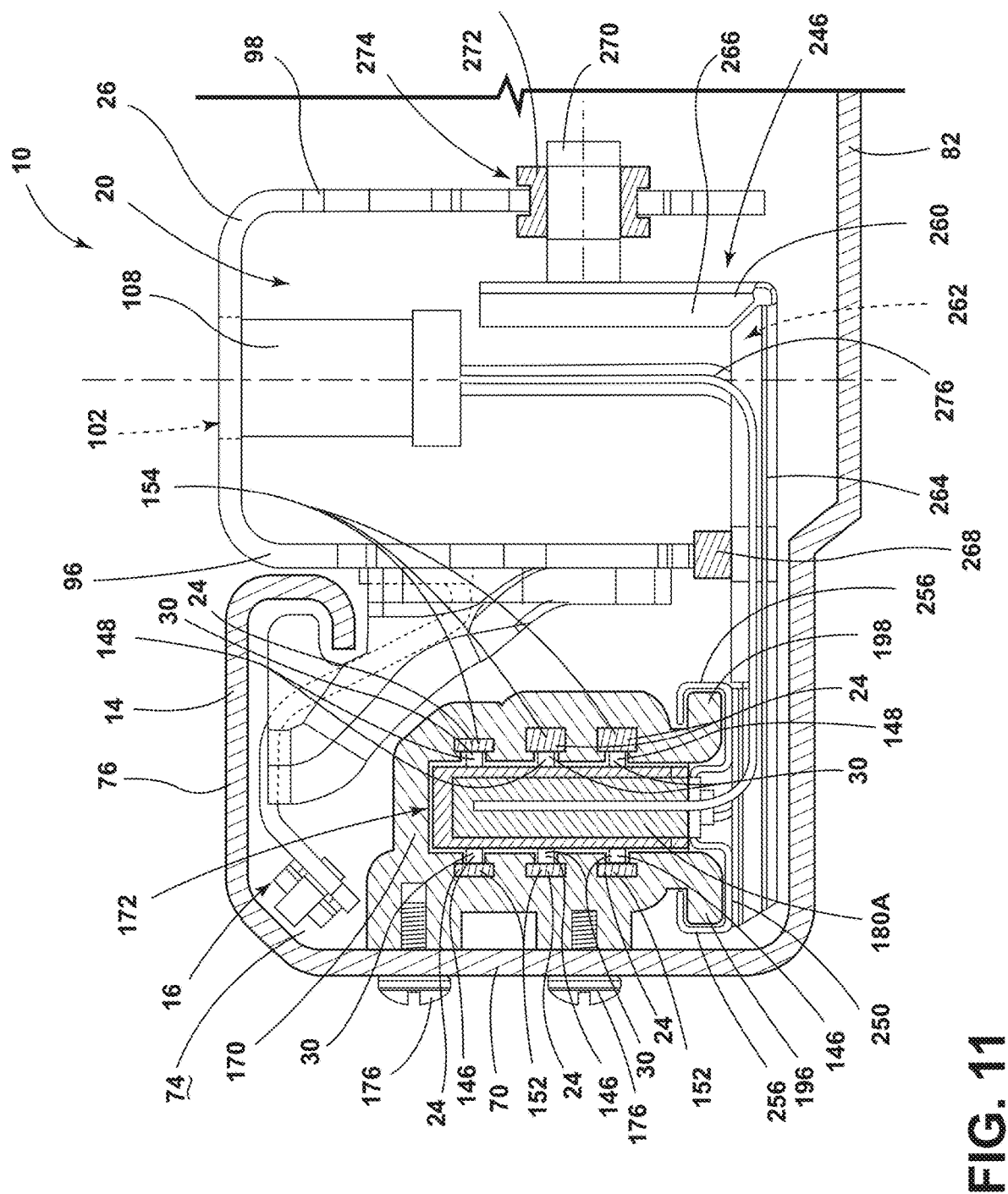
FIG. 11 is a front elevational view of the end of the track assembly and communication assembly of FIG. 10.
Figure 12:
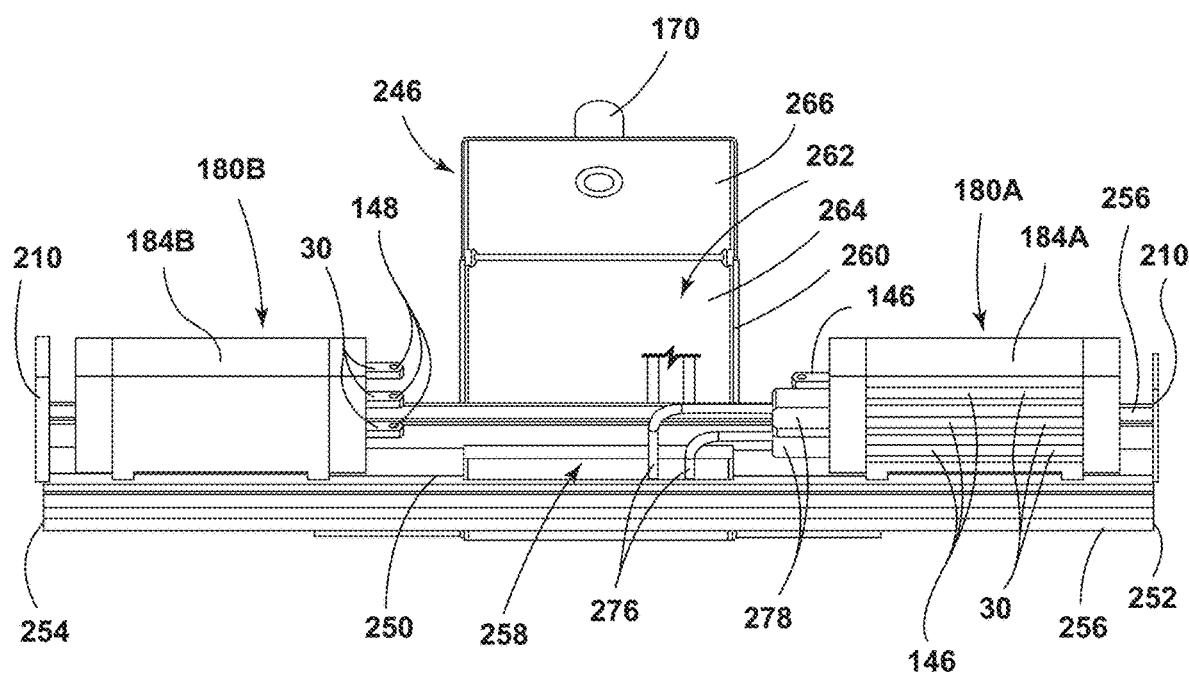
FIG. 12 is a top perspective view of a support and brush cartridge of the communication assembly of FIG. 10 with the housing removed.

Referring now to FIGS. 10-12, the communication assembly 86 is illustrated, according to various examples, with the housing 170 defining the housing channel 172 opening downward toward the bottom wall 82 of the track 14. The housing 170 is configured to simultaneously receive a first brush cartridge 180A and a second brush cartridge 180B. The first brush cartridge 180A may be configured to transfer data, and the second brush cartridge 180B may be configured to transfer power, as discussed in more detail elsewhere herein.

Figure 13A:
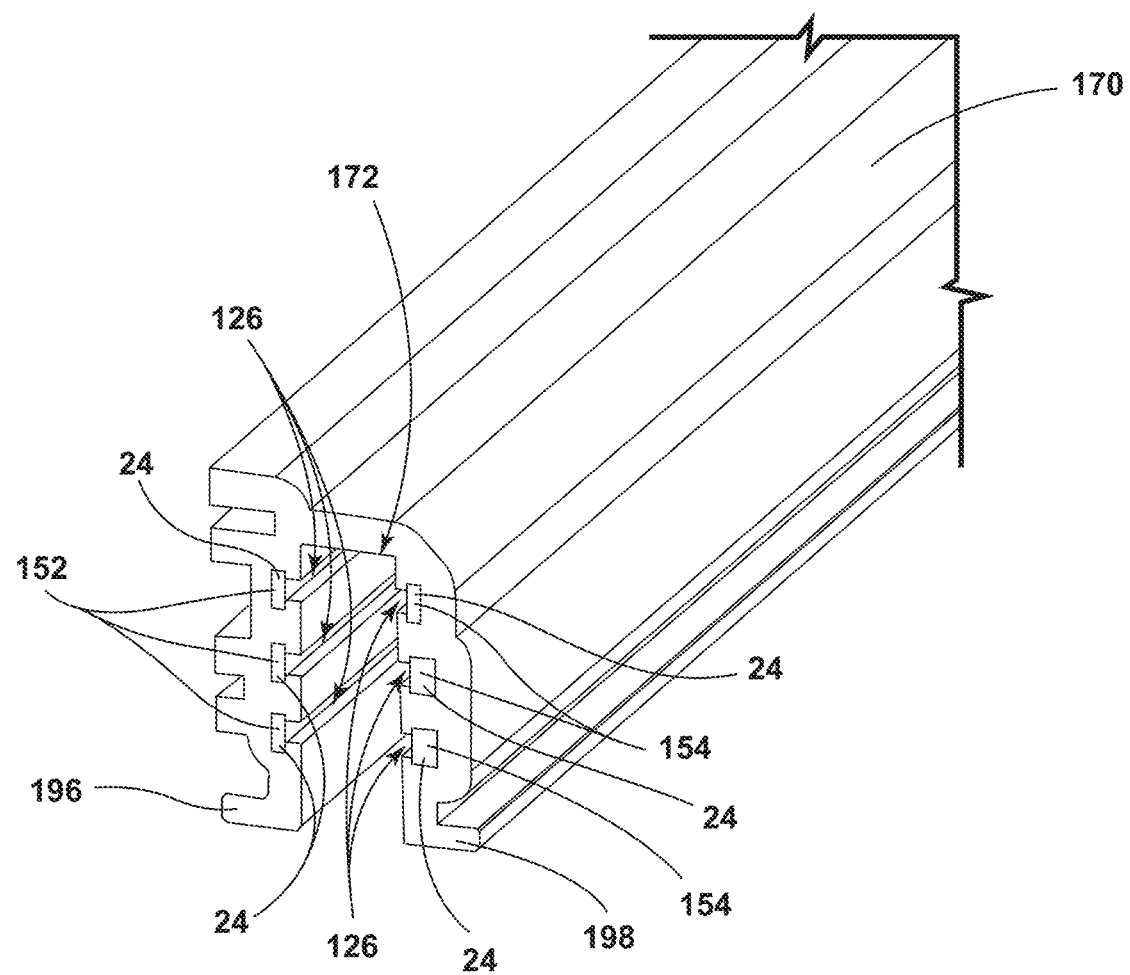
FIG. 13A is a side perspective view of the housing of FIG. 10.

As previously discussed, and as illustrated in FIG. 13A, the housing 170 defines the housing channel 172 and further defines the plurality of channels 126 in communication with the housing channel 172. The first portion 152 of the plurality of contact strips 24 are positioned on a first side of the housing channel 172 and the second portion 154 of the plurality of contact strips 24 are positioned on a second side of the housing channel 172. The housing 170 further includes the first and second outer steps 196, 198 positioned on opposing sides of the housing 170. The housing 170 is sized to receive the first and second brush cartridges 180A, 180B and is fixedly coupled with the track 14 (e.g., the housing 170 is coupled with the track 14 by fasteners 176).

As illustrated in FIGS. 10-13C, each brush cartridge 180A, 180B includes one of the first portion 146 of the plurality of contacts 30 and the second portion 148 of the plurality of contacts 30. For example, as illustrated, the first portion 146 of the plurality of contacts 30 extends from the first brush cartridge 180A in a first direction, and the second portion 148 of the plurality of contacts 30 extends from the second brush cartridge 180B in a second direction. The first direction is opposite the second direction such that the first portion 146 of the plurality of contacts 30 is positioned to engage with the first portion 152 of the plurality of contact strips 24 and the second portion 148 of the plurality of contacts 30 is positioned to engage with the second portion 154 of the plurality of contact strips 24.

Referring now to FIGS. 10-12, each brush cartridge 180A, 180B is coupled with a support 246 and is configured to be positioned within, and movable along, the housing channel 172. The support 246 includes a base portion 250 configured to be operably coupled with the first and second brush cartridges 180A, 180B. For example, the brush cartridges 180A, 180B may be coupled with the base portion 250 by heat staking, fasteners, welding, adhesive, or any other form of coupling configured to fixedly couple the brush cartridges 180A, 180B with the support 246. As illustrated, the first brush cartridge 180A is positioned at a first end 252 of the base portion 250 of the support 246, and the second brush cartridge 180B is positioned at a second end 254 of the base portion 250 of the support 246. A block member 210 may be positioned at each of the first and second ends 252, 254 of the base portion 250 and may be configured to clean the plurality of contact strips 24. An engagement edge 256 extends along at least one side of the base portion 250 between the first and second ends 252, 254 to form one or more hooks 204 to engage with one of the first and second outer steps 196, 198 of the housing 170 and slidably coupled the support 246 with the housing 170.

The base portion 250 defines an opening 258 between the first and second brush cartridges 180A, 180B configured to act as a guide for a plurality of conduits 276. Each of the plurality of conduits 276 is coupled with one of the first and second brush cartridges 180A, 180B by one of a plurality of connectors 278. The plurality of conduits 276 extend from one of the first and second brush cartridges 180A, 180B and through the opening 258. Each of the plurality of conduits 276 is engaged with the first upper electrical connector 108 to electrically couple the first upper electrical connector 108 with one of the first and second brush cartridges 180A, 180B. Any number of conduits 276 may be used in order to couple both the first and second brush cartridge 180A, 180B with the first upper electrical connector 108 and to transmit power or data, as discussed in more detail elsewhere herein.

With continued reference to FIGS. 10-12, an extension member 260 defines a guide space 262 in communication with the opening 258. The guide spaces 262 is defined by a first portion 264 and a second portion 266 of the extension member 260. The first portion 264 is integrally formed or operably coupled with the second portion 266 and may be positioned to form an L-shaped extension member 260. The first portion 264 of the extension member 260 is fixedly coupled with the base portion 250 to at least partially align the guide space 262 with the opening 258 to further guide the plurality of conduits 276. For example, the base portion 250 may be spot-welded to a first portion 264 of the extension member 260.

As best illustrated in FIG. 11, the extension member 260 is positioned such that the first portion 264 of the extension member 260 extends through the side slot 104 of the rail cartridge 26 and the second portion 266 extends upward parallel to the first and second sidewalls 96, 98 of the rail cartridge 26. Moreover, the extension member 260 is configured to align the plurality of conduits 276 with the first upper electrical connector 108. The first portion 264 of the extension member 260 may be positioned within a rubber carrier 268 extending through the side slot 104 or beneath the sidewall 96 of the rail cartridge 26. The second portion 266 of the extension member 260 includes a shaft 270 extending perpendicular to the second portion 266 and configured to be received by an opening 274 defined by one of the sidewalls 96, 98. The shaft 270 is coupled with the sidewall 96, 98 and may be surrounded by a grommet 272 positioned within the opening 274. When the shaft 270 is coupled with the sidewall 96, 98 the second portion 266 is positioned to substantially align the guide space 262 with the first upper electrical connector 108.

Figure 13B:
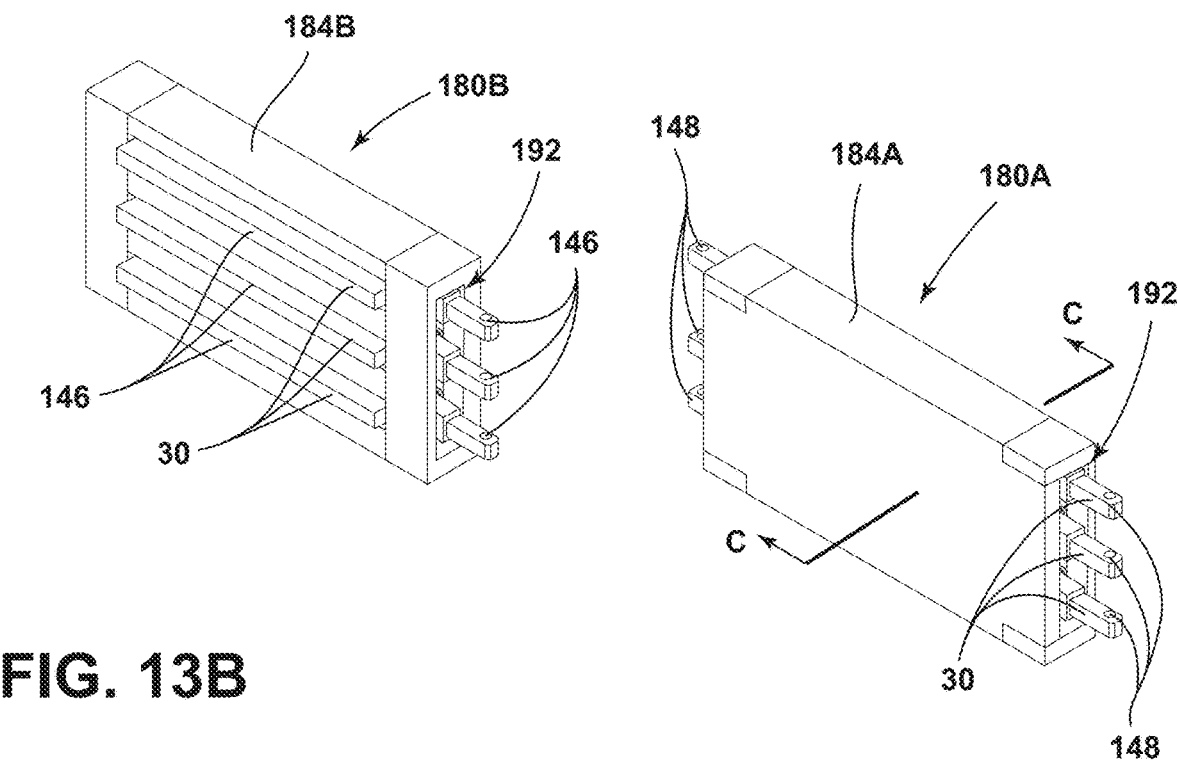
FIG. 13B is a side perspective view of the brush cartridge of FIG. 10.
Figure 13C:
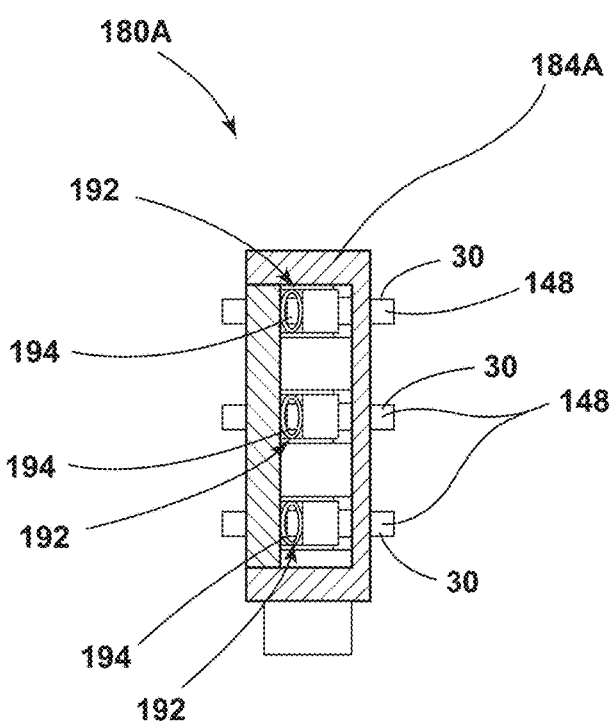
FIG. 13C is a cross-sectional view taken along line C-C of FIG. 13B.

As best illustrated in FIGS. 13B and 13C, each brush cartridge 180A, 180B includes a body 184A, 184B. The bodies 184A, 184B define the plurality of receiving spaces 192 configured to receive the plurality of contacts 30. For example, the plurality of receiving spaces 192 of the first brush cartridge 180A are configured to receive the first portion 146 of the plurality of contacts 30, and the plurality of receiving spaces 192 of the second brush cartridge 180B are configured to receive the second portion 148 of the plurality of contacts 30. Each of the plurality of contacts 30 may be biased away from the respective body 184A, 184B. For example, as illustrated, the plurality of springs 194 may be positioned within the plurality of receiving spaces 192 such that each spring 194 is positioned to bias one of the plurality of contacts 30 outward and away from the respective body 184A, 184B.

Referring again to FIGS. 10-12, when the brush cartridges 180A, 180B are positioned within the housing channel 172, the first brush cartridge 180A is configured to position the first portion 146 of the plurality of contacts 30 to engage with the first portion 152 of the plurality of contact strips 24. The opposing side of the body 184A does not engage with the plurality of channels 126. The second brush cartridge 180B is configured to position the second portion 148 of the plurality of contacts 30 such that the second portion 148 of the plurality of contact strips 30 each engage with one of the second portion 154 of the plurality of contact strips 24, and the opposing side of the body 184B does not engage with the plurality of channels 126. The first and second brush cartridges 180A, 180B are aligned to allow the housing channel 172 to be narrowed as compared to a housing channel 172 for a single brush cartridge 180, as described above.

Figure 14:
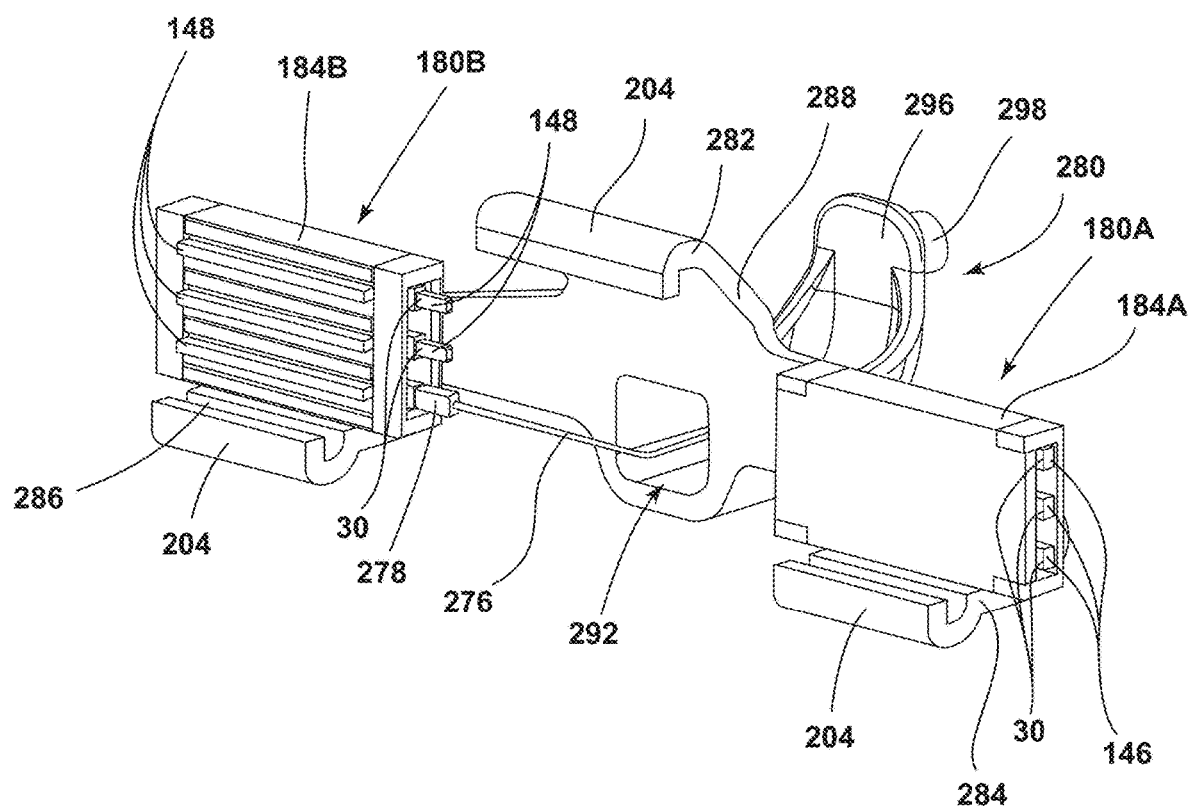
FIG. 14 is a side perspective view of a support and brush cartridge of a communication assembly, according to various examples.

Referring now to FIG. 14, a support 280 configured to be used in place of the support 246 illustrated in FIGS. 10-12 is illustrated. While only the structure of the support 280 is discussed in detail below, it will be understood that the support 280 may be used in the same manner as and/or in place of the support 246 previously illustrated.

As illustrated, the support 280 is configured to support the first and second brush cartridges 180A, 180B. The support 280 includes a body portion 282 having first and second support arms 284, 286 extending away from the body portion 282 and configured to support the first and second brush cartridges 180A, 180B. The first support arm 284 is configured to be coupled with the first brush cartridge 180A, and the second support arm 286 is configured to be coupled with the second brush cartridge 180B. For example, the brush cartridges 180A, 180B may be coupled with the first and second support arms 284, 286 by heat staking, fasteners, welding, adhesive, or any other form of coupling configured to fixedly couple the brush cartridges 180A, 180B with the support 280.

An upper arm 288 extends from the body portion 282 and is spaced apart from the first and second support arms 284, 286. Each of the first and second support arms 284, 286 includes one of the plurality of hooks 204 configured to engage with one of the outer steps 196, 198 of the housing 170. The upper arm 288 further includes one of the plurality of hooks 204 to engage with the other step of the outer steps 196, 198 of the housing 170. The positioning of the upper arm 288 and the first and second support arms 284, 286 is configured to engage the plurality of hooks 204 with the first and second outer steps 196, 198 of the housing 170 to slidably couple the support 280 with the housing 170.

With continued reference to FIG. 14, the body portion 282 of the support 280 includes an extension 296 defining a channel 292. The channel 292 is configured to receive the plurality of conduits 276 from the first and second brush cartridges 180A, 180B. As previously discussed, each of the plurality of conduits 276 is operably coupled with one of the plurality of contacts 30 by one of a plurality of conduit connectors 278. The extension 296 is shaped to align the plurality of conduits 276 with the first upper electrical connector 108 and includes a shaft 298 configured to engage with the sidewall 96, 98 of the rail cartridge 26 to secure the positioning of the extension 296 and the plurality of conduits 276 within the rail cartridge 26.

Figure 15:
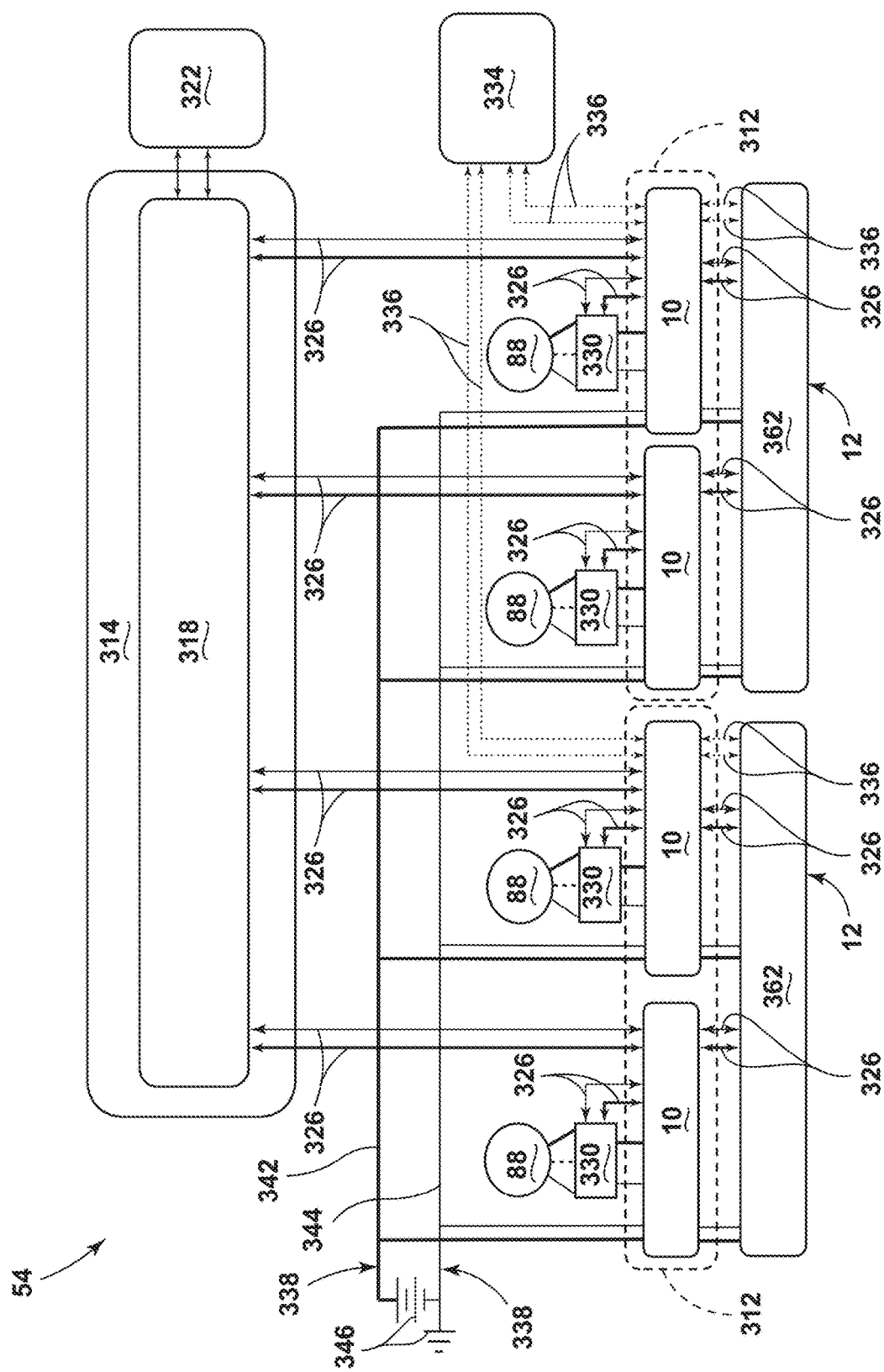
FIG. 15 is a schematic view of communication between a vehicle and a seating assembly via a communication assembly, according to various examples.

Referring now to FIG. 15, communication between the vehicle 54 and the vehicle seating assembly 12 is shown according to various examples. Specifically, a vehicle control module (VCM) 314 can be provided with a logic and message interface 318 that enables communication between a communication gateway 322 and the track assemblies 10. In some examples, the communication gateway 322 may be an enhanced central gateway. The communication gateway 322 can enable communication between various modules, nodes, communication buses, and the like. Accordingly, the communication gateway 322 may facilitate data transfer and/or communication between various components of the vehicle 54 and/or the vehicle seating assembly 12. In examples, the communication gateway 322 can include a user interface where a user can select options for the vehicle seating assembly 12 and/or adjust a setting of the vehicle seating assembly 12. For example, the communication gateway 322 can be utilized to relay comfort adjustment requests, position adjustment along the track assemblies 10 requests, and/or vehicle-based adjustment requests (e.g., entertainment adjustments, media volume adjustments, etc.).

The logic and message interface 318 can be communicatively coupled to the track assemblies 10. For example, the communicative coupling between the logic and message interface 318 and the track assemblies 10 can be accomplished by way of a high-speed communication network. In one specific example, the high-speed communication network can be a Controller Area Network (CAN) bus. As illustrated, the logic and message interface 318 can be hard-wired to the track assemblies 10. For example, one or more conduits 326 can extend between each of the track assemblies 10 and the logic and message interface 318.

Referring still to FIG. 15, the track assemblies 10 can also be communicatively coupled to a control and switch module 330. The track assembly 10 and the associated control and switch module 330 can be communicatively coupled by way of the high-speed communication network. For example, the track assembly 10 and the associated control and switch module 330 can be communicatively coupled by the CAN bus. The control and switch module 330 can be communicatively coupled to the motor assembly 88 of the rail cartridge 26. Accordingly, functions of the control and switch module 330 can include, but are not limited to, communicating instructions from the vehicle 54 and/or a user to effect actuation of the rail cartridge 26 relative to the track assembly 10. For example, the control and switch module 330 can register instructions from the vehicle 54 and/or the user to adjust a position of the vehicle seating assembly 12 along the track 14. The instructions registered by the control and switch module 330 can then be relayed to the motor assembly 88 of the rail cartridge 26 to effect the desired adjustment. For example, the control and switch module 330 can store a current position of the rail cartridge 26 along the track 14 of the track assembly 10 and can instruct the motor assembly 88 to actuate the rail cartridge 26 the desired amount and in the desired direction along the track 14. In one specific example, the vehicle 54 and/or a user may actuate a switch (e.g., a seat-mounted positioning switch) that is associated with adjustment of a position of the vehicle seating assembly 12 and in response to the actuated switch, the control and switch module 330 can relay instructions to the motor assembly 88 to effect the desired degree of adjustment. While the control and switch module 330 is described as relaying or communicating instructions to the motor assembly 88, one of skill in the art will recognize that such a relaying or communicating of instructions may take the form of a power signal that is provided with a defined duration that effects the desired degree of actuation of the vehicle seating assembly 12 by the motor assembly 88. In other words, the control and switch module 330 can receive the instructions from the vehicle 54 and/or the user, the control and switch module 330 can then interpret the received instructions, and the control and switch module 330 can then provide power to the motor assembly 88 in a manner that effects the desired degree and direction of actuation of the vehicle seating assembly 12.

Referring now to FIGS. 1-15, a vehicle seat control module 362 can be communicatively coupled to the vehicle control module 314, the logic and message interface 318, the communication gateway 322, and/or the control and switch module 330 by way of the track assembly 10. For example, the communicative coupling between the vehicle seat control module 362, the vehicle control module 314, the logic and message interface 318, the communication gateway 322, and/or the control and switch module 330 can be established by the communication assembly 86 when the plurality of contacts 30 are engaged with the plurality of contact strips 24. Communication between the vehicle seat control module 362 and the track assembly 10 can be accomplished by way of the high-speed communication network, such as a CAN bus. For example, components of the vehicle seating assembly 12 (e.g., motors, restraints, heating assemblies, ventilation assemblies, etc.) can be coupled to one another as part of a component based CAN bus and the component based CAN bus can communicatively couple with a vehicle-based CAN bus by way of the engagement between the plurality of contacts 30 and the plurality of contact strips 24 of the communication assemblies 86 of the track assemblies 10. By so arranging the high-speed communication networks of the vehicle 54 and the vehicle seating assembly 12, a sliding communicative coupling can be provided between the track assemblies 10 of the vehicle 54 and the vehicle seating assembly 12 that prevents wiring harnesses or wire bundles from becoming tangled during traversal events as the vehicle seating assembly 12 is actuated along the track assembly 10. The various components of the vehicle 54 and the vehicle seating assembly 12 that are capable of communication along the high-speed communication network(s) can be coupled to one another by conduits 326. In various examples, a restraint control module 334 can also be communicatively coupled (e.g., hard-wired) to one or more of the tracks 14 of the track assembly 10 through the engagement of the plurality of contacts 30 with the plurality of contact strips 24.

Figure 16:
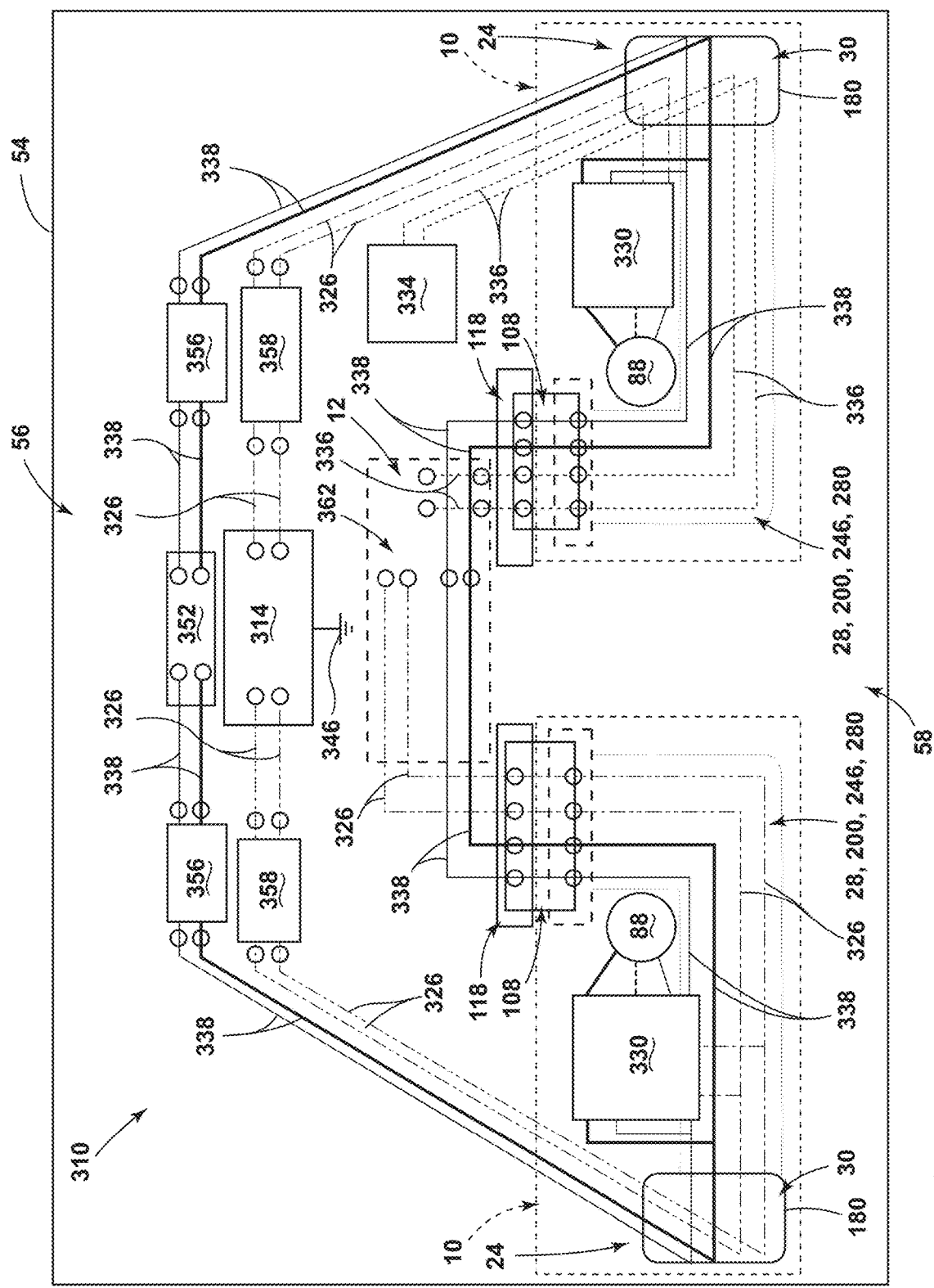
FIG. 16 is a schematic view of a vehicle illustrating a communication network with a vehicle seating assembly coupled with a pair of track assemblies utilizing a communication assembly, according to various examples.
Figure 17:
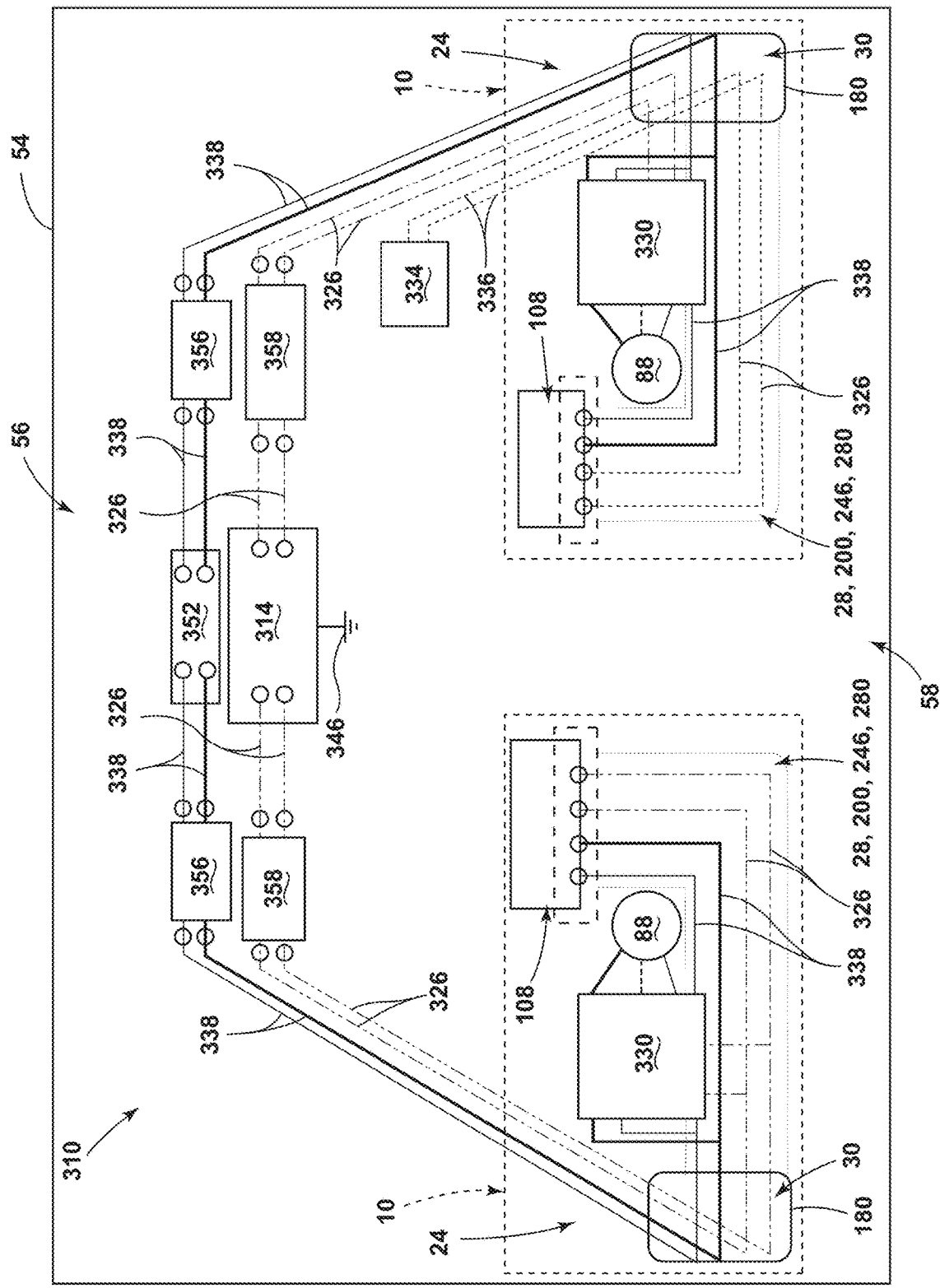
FIG. 17 is a schematic view of a vehicle illustrating a communication network utilizing a communication assembly, according to various examples.

Referring now to FIGS. 15-17, a vehicle-mounted power supply 352 (e.g., one or more batteries) may be electrically coupled with one or more tracks 14 of the track assembly 10 to provide power to the track assembly 10. For example, power conduits 338 can extend from the vehicle-mounted power supply 352 to each of the track assemblies 10. The power conduits 338 can include positive voltage conduits 342 and negative voltage conduits 344 in various examples. The power conduits 338 may be coupled to a ground 346 that is common for the positive voltage conduits 342 and the negative voltage conduits 344. For example, the ground 346 may be a chassis ground such that the grounding of the power conduits 338 is a chassis of the vehicle 54.

Referring to FIGS. 16 and 17, an electrical system 310 coupling the vehicle 54 with the vehicle seating assembly 12 through the track assemblies 10 is schematically depicted. The electrical system 310 includes a pair of track assemblies 10 (e.g., a track plank 312), the conduits 326 that are part of the high-speed communication network, conduits 336 that extend from the restraint control module 334 to the track assemblies 10, the power conduits 338, the communication assemblies 86, and the brush cartridges 180. Each of the track assemblies 10 includes a brush cartridge 180 operably coupled with a first upper electrical connector 108. As illustrated in FIGS. 1-14, each brush cartridge 180 is electrically coupled with the respective first upper electrical connector 108 and is configured to transmit data and/or power between the vehicle seating assembly 12 and various components of the vehicle seating assembly 12 (e.g., the motor assembly 88, the restraint control module 334, etc.).

Referring again to FIGS. 1-17, the track assemblies 10 are provided with communication assemblies 86 including the plurality of contacts 30 configured to engage with and be slidable along the plurality of contact strips 24. The first upper electrical connector 108 is coupled with the plurality of contacts 30 by a brush cartridge 180, 180A, 180B, a plurality of conduits 138, 232, 276, and/or a support 28, 200, 246, 280, and the second upper electrical connector 118 coupled with the vehicle seating assembly 12. Each of the conduits 138, 232, 276 described with respect to FIGS. 1-14 may be configured as a power conduit 338, a conduit 326 of the high-speed communication network, and/or a conduit 336 configured to couple the restraint control module 334 to the track assemblies 10 and the vehicle seating assembly 12.

As previously discussed, the first and second upper electrical connectors 108, 118 may be quick-connect connectors that rapidly and readily couple with one another. Examples of quick-connect connectors can include, but are not limited to, peripheral component interconnect (PCI) slots, peripheral component interconnect (PCI) express slots, male-to-female connectors, or any other suitable connectors that facilitate rapid alignment and coupling between the vehicle seating assembly 12 and the rail cartridge 26 of the track assemblies 10. The coupling of the vehicle seating assembly 12 and the track assemblies 10 by way of the first and second upper electrical connectors 108, 118 is configured to establish a communicative coupling between the control module 362 of the vehicle seating assembly 12 and the track assemblies 10, and ultimately various components of the vehicle 54.

The rail cartridges 26 are configured to be slidable relative to the respective tracks 14 of the track assemblies 10 by activation or actuation of the motor assembly 88. The rail cartridge 26 may be actuated in a fore-aft direction such that the rail cartridges 26 travel along the tracks 14 of the respective track assemblies 10 between the front 56 of the vehicle 54 and the rear 58 of the vehicle 54. As the rail cartridges 26 traverse the tracks 14 of the track assemblies 10, the plurality of contacts 30 are slidably engaged with, and maintain contact with, the plurality of contact strips 24 positioned within the first lateral channel 16 such that power and/or data signals can be transmitted and/or received between the vehicle 54 and the vehicle seating assembly 12 via conduits 138, 232, 276, as described elsewhere herein.

When the first portion 146 of the plurality of contacts 30 are engaged with the first portion 152 of the plurality of contact strips 24, the data signals are transmitted along the conduits 326 that are part of the high-speed communication network and/or the conduits 336 that are part of the coupling of the restraint control module 334 to the track assemblies 10 and the vehicle seating assembly 12. The conduits 326 that are part of the high-speed communication network can be coupled to the vehicle control module (VCM) 314 by VCM connectors 358. When the second portion 148 of the plurality of contacts 30 is engaged with the second portion 154 of the plurality of contact strips 24, the power signals or power voltage is supplied by the power conduits 338. The power signals or power voltage can be supplied by a vehicle-mounted power supply 352, such as a battery. The power conduits 338 can engage with the vehicle-mounted power supply 352 by way of a power connector 356 that is utilized to couple the track assembly 10 to the vehicle-mounted power supply 352. Further, when the plurality of contacts 30 are engaged with the plurality of contact strips 24, the restraint control module 334 of the vehicle 54 may be configured to communicate with components of the vehicle seating assembly 12 via the conduits 336 and may be configured to utilized either of the track assemblies 10 within the track plank 312.

In various examples, the present disclosure provides one or more track assemblies 10 that receive one or more vehicle seating assemblies 12 while maintaining the communicative coupling of the various components of the vehicle seating assembly 12 and the vehicle 54. The communicative coupling between the vehicle seating assembly 12 and the track assembly 10 can be accomplished in a manner that prevents wiring harnesses, wire bundles, and the like from intruding into a travel path of the vehicle seating assembly 12 as the vehicle seating assembly 12 traverses the track assembly 10. Rather, the communicative coupling between the vehicle seating assembly 12 and the track assembly 10 is established by the sliding contact between the plurality of contacts 30 operably coupled with the vehicle seating assembly 12 and the plurality of contact strips 24 positioned within the track 14. Accordingly, a risk of tangling or the wires and/or conduits that might have otherwise been used in the absence of the sliding contact provided in the present disclosure can be avoided. Additionally, a support 28, 200, 246, 280 is configured to house wires and/or conduits to prevent tangling of and/or damage to the wires and/or conduits. The present disclosure provides a compact and/or consolidated communicative coupling between the vehicle seating assembly 12 and the track assembly 10 such that directly wiring (e.g., hard-wiring) the various components of the vehicle seating assembly 12 to the various components of the vehicle 54 is avoided, thereby, enabling a greater degree of freedom for the movement of the vehicle seating assembly 12 along the track assembly 10 and/or within the cabin 52 of the vehicle 54. For example, the vehicle seating assembly 12 may be capable of movement along the track assembly 10 of up to one meter (1 m), up to two meters (2 m), up to three meters (3 m), or up to four meters (4 m). In various examples, the vehicle seating assembly 12 may be capable of movement along an entirety of a length of the track assembly 10, movement along the track assembly 10 of up to ninety-percent (90%) of the length of the track assembly 10, movement along the track assembly 10 of up to eighty-percent (80%) of the length of the track assembly 10, movement along the track assembly 10 of up to seventy-percent (70%) of the length of the track assembly 10, movement along the track assembly 10 of up to sixty-percent (60%) of the length of the track assembly 10, and/or combinations or ranges thereof. The high-speed communication network (e.g., CAN bus) enables the communicative coupling between the various components of the vehicle 54 and the various components of the vehicle seating assembly 12. Additionally, the high-speed communication network is capable of distributing a high volume of communication. Accordingly, the high-speed communication network enables a decrease in physical wiring and/or conduits that may have otherwise prevented the degree of freedom of movement of the vehicle seating assembly 12. In various examples, the communications transmitted along the high-speed communication network may be assigned a priority level (e.g., high priority vs. low priority). For example, restraint deployment signals may be assigned a high priority level while comfort or convenience adjustments to the vehicle seating assembly 12 may be assigned a low priority level. Accordingly, high priority and low priority communications may be transmitted along the high-speed communication network without preventing the high priority communications from reaching their intended recipient.

It will be understood by one having ordinary skill in the art that construction of the described disclosure and other components is not limited to any specific material. Other exemplary examples of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It will be understood by one having ordinary skill in the art that construction of the described disclosure and other components is not limited to any specific material. Other exemplary embodiments of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A track assembly for a vehicle seating assembly, comprising:
    a track defining a lateral channel and a central channel, wherein the lateral channel is in communication with the central channel;
    a conductive rail coupled with the track and extending along the lateral channel, the conductive rail including a plurality of contact strips;
    a rail cartridge positioned within the central channel and slidable along the track, wherein the lateral channel is at least partially enclosed by the track and the rail cartridge;
    a support operably coupled with the rail cartridge and extending from the central channel into the lateral channel; and
    a plurality of contacts operably coupled with the support and configured to engage with the plurality of contact strips.

2. The track assembly of claim 1, wherein the track includes first and second lateral walls, the first lateral wall at least partially defining the lateral channel, and further wherein the conductive rail is positioned to orient the plurality of contact strips parallel to the first lateral wall.

3. The track assembly of claim 2, wherein each of the first and second lateral walls is integrally formed with one of a first top portion and a second top portion extending perpendicularly from the first and second lateral walls, and further wherein the rail cartridge includes first and second sidewalls, the first and second sidewalls positioned substantially flush with the first and second top portions.

4. The track assembly of claim 3, wherein the first sidewall of the rail cartridge defines an opening, and further wherein the support extends at least partially through the opening.

5. The track assembly of claim 1, wherein the support includes:
    a body portion having a surface positioned parallel to and spaced apart from the conductive rail, wherein the plurality of contacts extend from the body portion;
    a first electrical connector positioned within the rail cartridge and configured to engage with a second electrical connector positioned exterior of the rail cartridge; and
    an arm extending between the body portion of the support and the first electrical connector.

6. The track assembly of claim 5, wherein the plurality of contacts are spring-loaded and are configured to be biased toward the conductive rail.

7. The track assembly of claim 5, wherein the support is configured to house a plurality of electrical components electrically coupled with the plurality of contacts and the first electrical connector.

8. A track assembly for a vehicle seating assembly, comprising:
    a track defining a lateral channel and a central channel, wherein the lateral channel is in communication with the central channel;
    a housing coupled with the track and positioned within the lateral channel, wherein the housing defines a housing channel, and further wherein a plurality of contact strips are positioned on an interior surface of the housing;
    a rail cartridge positioned within the central channel and slidable along the track, wherein the lateral channel is at least partially enclosed by the track and the rail cartridge;
    a support operably coupled with the rail cartridge and extending from the central channel into the lateral channel; and
    a plurality of contacts operably coupled with the support and configured to engage the plurality of contact strips.

9. The track assembly of claim 8, wherein the housing includes an outer step, and further wherein the support includes a plurality of hooks configured to receive the outer step and slidably couple the support with the housing.

10. The track assembly of claim 8, further comprising:
    a block extending from an end of the support, wherein the block is configured to be received by the housing channel to clean the plurality of contact strips.

11. The track assembly of claim 8, further comprising:
    a brush cartridge slidably positioned within the housing channel and having first and second sides, wherein the plurality of contacts extend from the first and second sides of the brush cartridge.

12. The track assembly of claim 8, further comprising:
    a first brush cartridge slidably positioned within the housing channel and coupled with the support, wherein a first portion of the plurality of contacts extends from the first brush cartridge; and
    a second brush cartridge slidably positioned within the housing channel and aligned with the first brush cartridge, wherein the second brush cartridge is coupled with the support, and further wherein a second portion of the plurality of contacts extends from the second brush cartridge.

13. The track assembly of claim 12, wherein the first and second portions of the plurality of contacts extend in opposing directions.

14. The track assembly of claim 8, wherein the support includes a wire tray configured to carry a plurality of electrical wires to electrically couple the plurality of contacts with a vertical electrical connector.

15. A track assembly for a vehicle seating assembly, comprising:
    a track defining a lateral channel and a central channel, wherein the lateral channel is in communication with the central channel;
    a plurality of contact strips operably coupled with the track and positioned within the lateral channel;

a rail cartridge positioned within the central channel and slidable along the track, wherein the lateral channel is at least partially enclosed by the track and the rail cartridge;

a support operably coupled with the rail cartridge and extending from the central channel into the lateral channel; and a plurality of contacts operably coupled with the support and configured to engage the plurality of contact strips.

16. The track assembly of claim 15, wherein the plurality of contact strips are coupled with a conductive rail positioned within the lateral channel.

17. The track assembly of claim 15, wherein the plurality of contact strips are coupled with a housing, wherein the housing defines a housing channel and the plurality of contact strips are positioned on an interior surface of the housing.

18. The track assembly of claim 17, further comprising:
a brush cartridge coupled with the support and slidably positioned within the housing channel and configured to carry the plurality of contacts.

19. The track assembly of claim 17, further comprising:

a first brush cartridge coupled with the support and slidably received within the housing channel, wherein a first portion of the plurality of contacts extends from the first brush cartridge in a first direction; and a second brush cartridge coupled with the support and slidably received within the housing channel, wherein the second brush cartridge is aligned with the first brush cartridge, and further wherein a second portion of the plurality of contacts extends from the second brush cartridge in a second direction, the second direction opposite the first direction.

20. The track assembly of claim 15, wherein the support is configured to guide a plurality of wires between the plurality of contacts and an electrical connector, and further wherein the electrical connector is positioned within the rail cartridge.

* * * * *